United States Patent
Sato

[11] Patent Number: 5,739,953
[45] Date of Patent: Apr. 14, 1998

[54] OPTICAL SYSTEM CAPABLE OF CORRECTING IMAGE POSITION

[75] Inventor: Susumu Sato, Chiba, Japan

[73] Assignee: Nikon Corporation, Tokyo, Japan

[21] Appl. No.: 692,224

[22] Filed: Aug. 7, 1996

Related U.S. Application Data

[62] Division of Ser. No. 401,792, Mar. 10, 1995, Pat. No. 5,646,779.

[30] Foreign Application Priority Data

Mar. 15, 1994 [JP] Japan ................................. 6-070034
Mar. 29, 1994 [JP] Japan ................................. 6-082454

[51] Int. Cl.$^6$ ........................... G02B 27/64; G02B 15/14
[52] U.S. Cl. .......................... 359/557; 359/554; 359/690
[58] Field of Search ........................... 359/554–557, 359/676–677, 680, 683–685, 689–690, 784–785

[56] References Cited

U.S. PATENT DOCUMENTS 4,978,205  12/1990  Sato ................................. 359/557
5,018,845   5/1991  Yamazaki ........................ 359/557
5,442,486   8/1995  Sato ................................. 359/557
5,490,014   2/1996  Suzuki ............................. 359/557
5,579,160  11/1996  Sato ................................. 359/557

*Primary Examiner*—Thong Nguyen
*Attorney, Agent, or Firm*—Shapiro and Shapiro

[57] ABSTRACT

An optical system includes a first lens group having a positive refractive power, a second lens group having a negative refractive power, and a third lens group having a positive refractive power. The third lens group comprises at least one positive lens and at least one negative lens. The second lens group is movable along a direction of an optical axis, and the third lens group is movable in a direction substantially perpendicular to the optical axis. The optical system satisfies:

$$0.25 < F1/FT < 0.46$$

where FT is the focal length of the optical system, and F1 is the focal length of the first lens group.

23 Claims, 24 Drawing Sheets

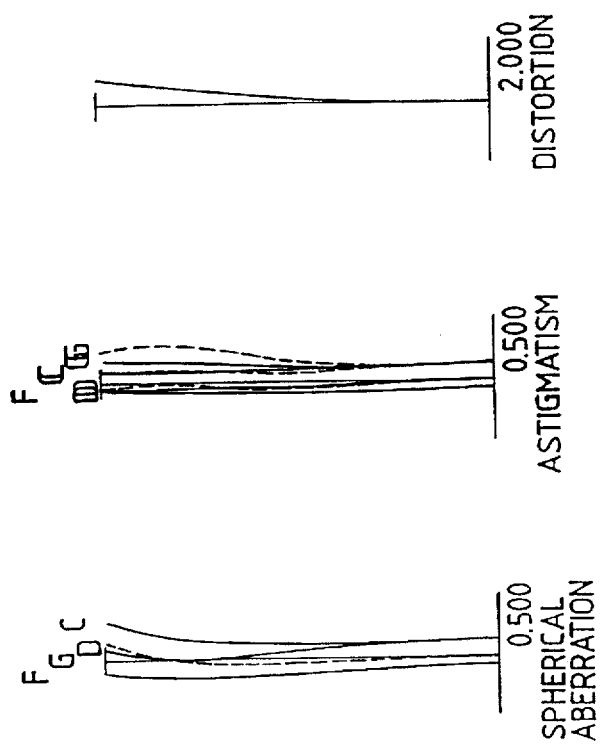
FIG. 5A  FIG. 5B  FIG. 5C
FIG. 5D
FIG. 5E
FIG. 5F

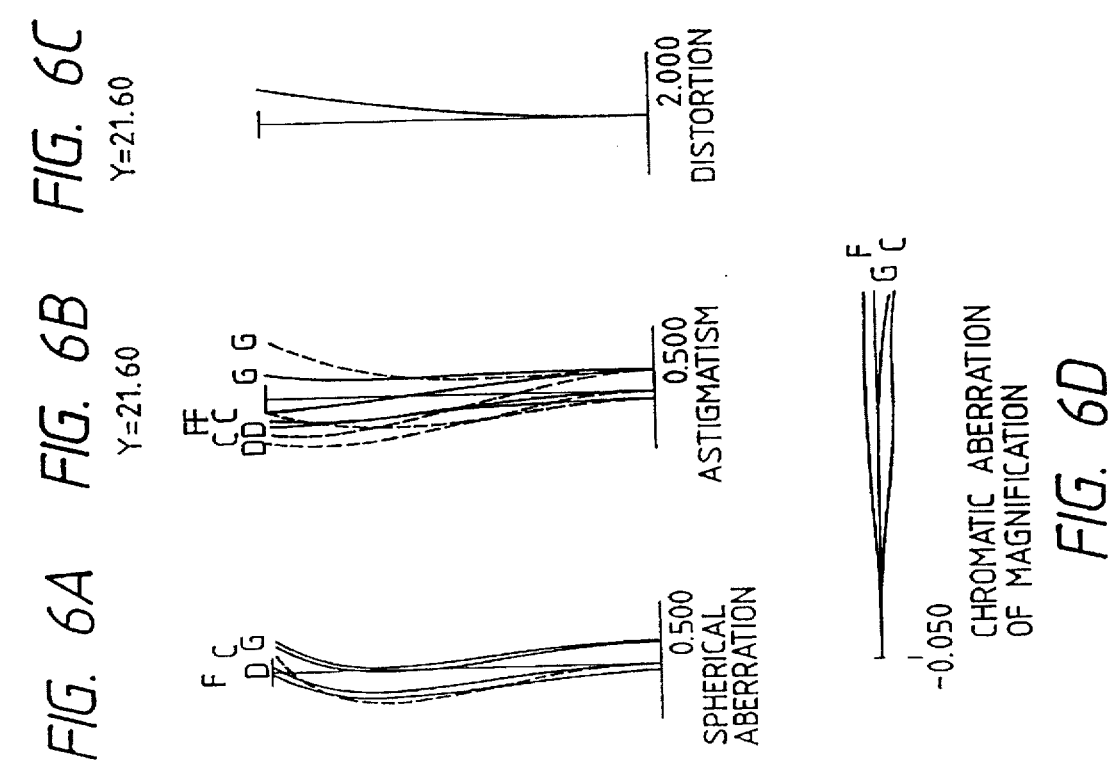

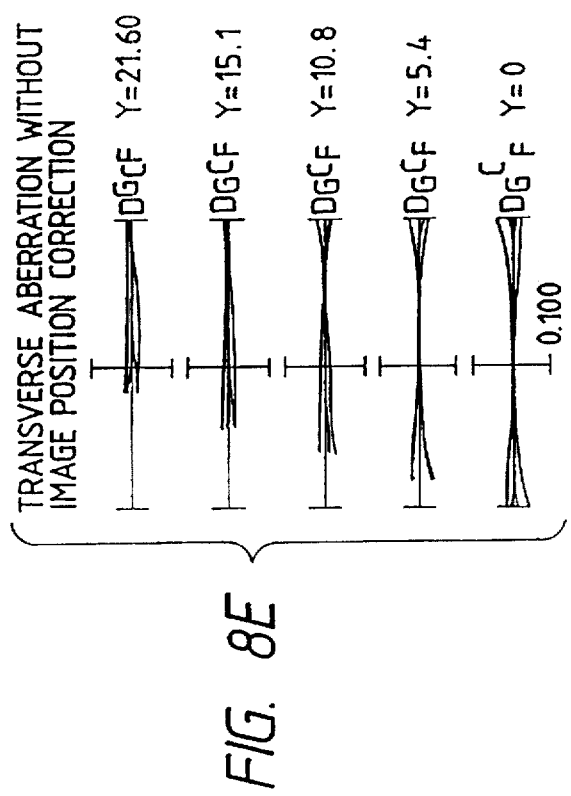
FIG. 8A  FIG. 8B  FIG. 8C
FIG. 8D
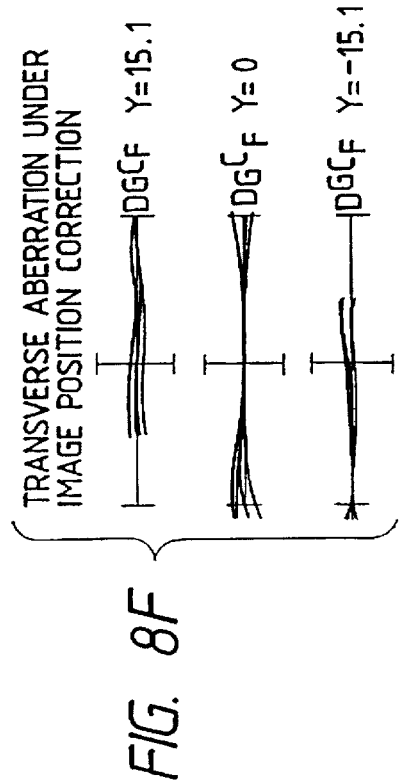
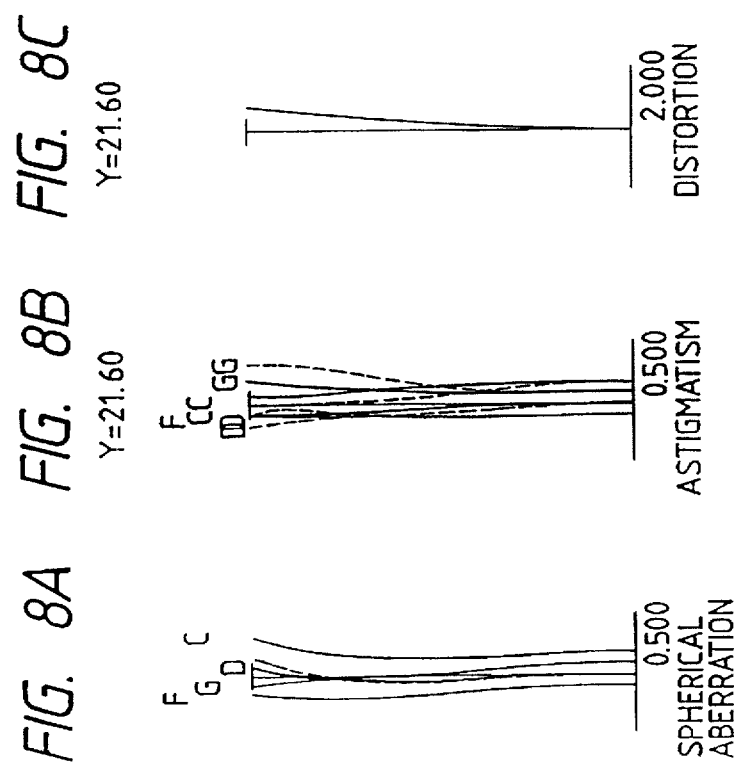
FIG. 8E
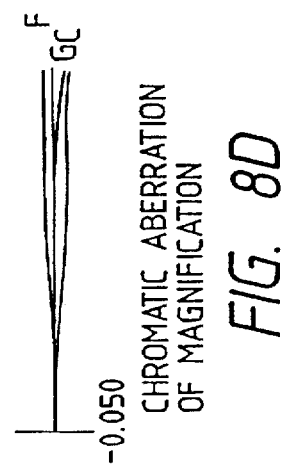
FIG. 8F

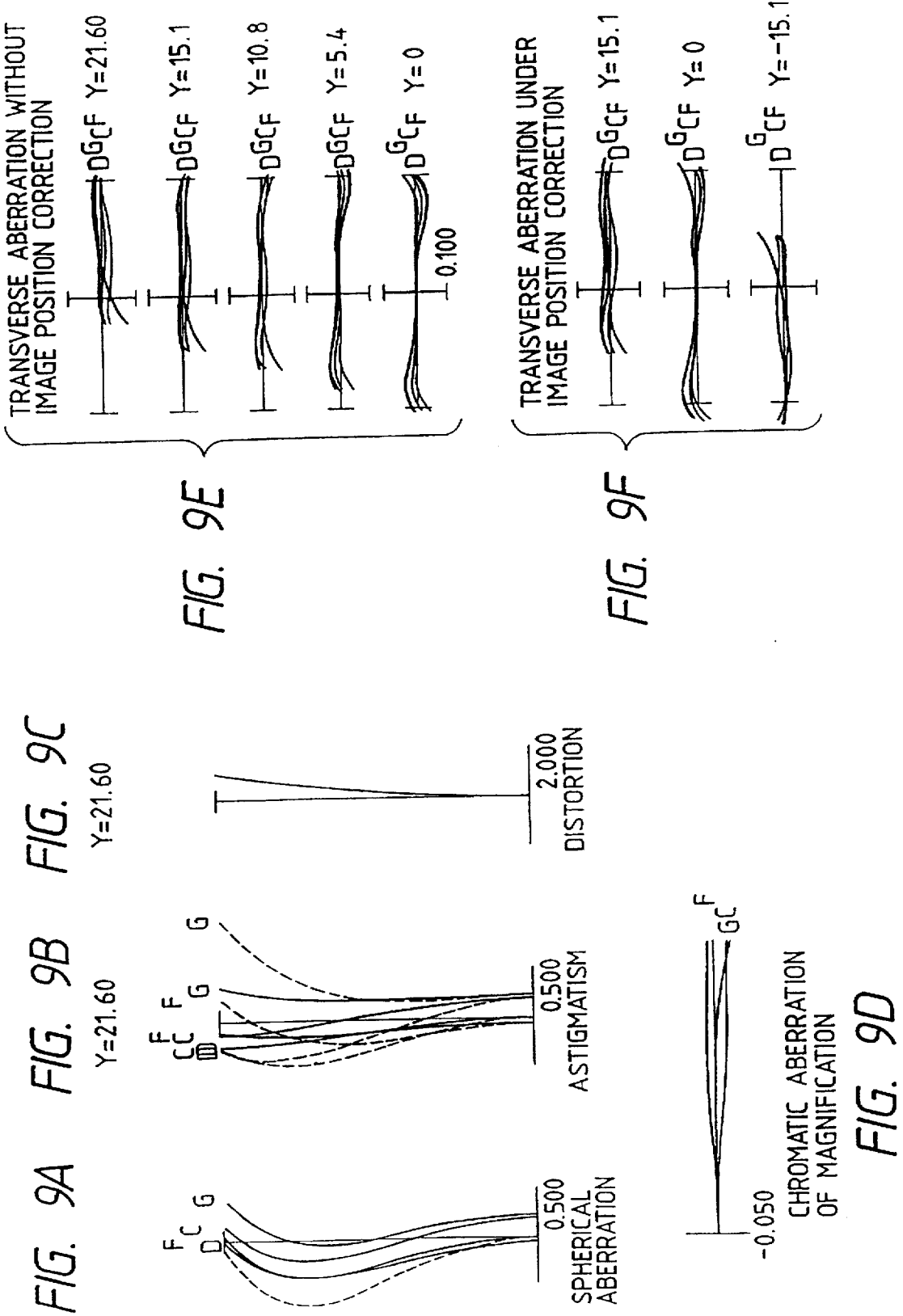

S: APERTURE EFFICIENCY (VIGNETTING FACTOR)
C: FIELD ILLUMINATION RATIO
D: FIELD ILLUMINATION RATIO (TAKING ACCOUNT OF DISTORTION)

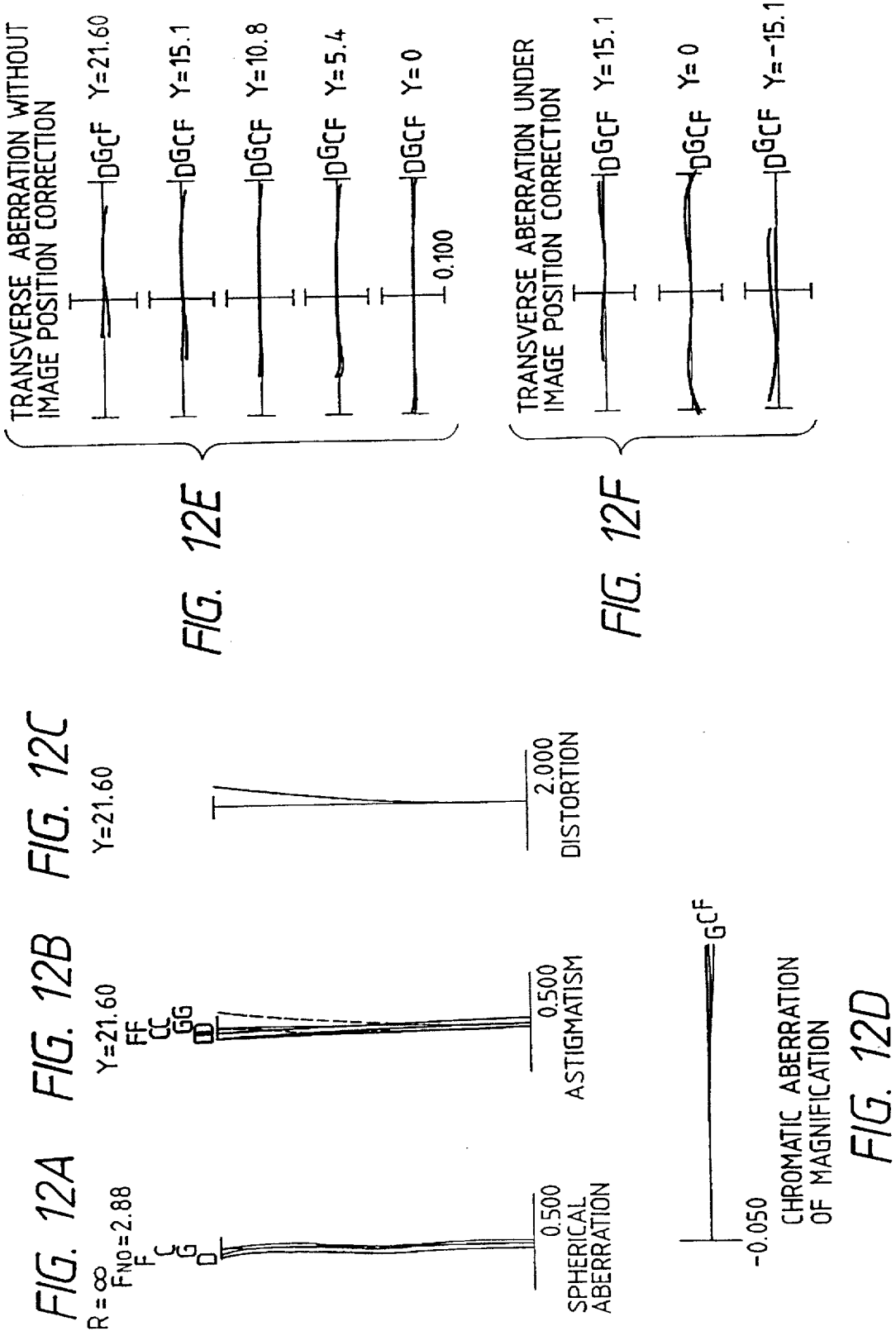

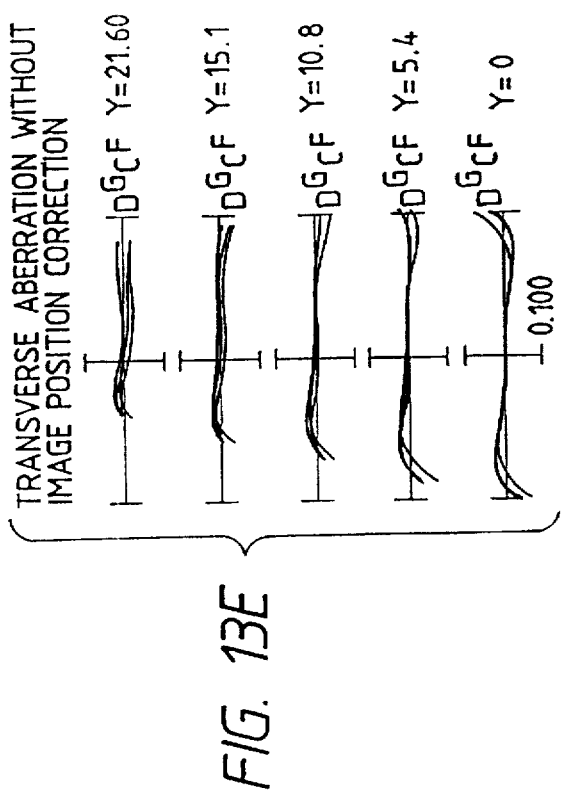
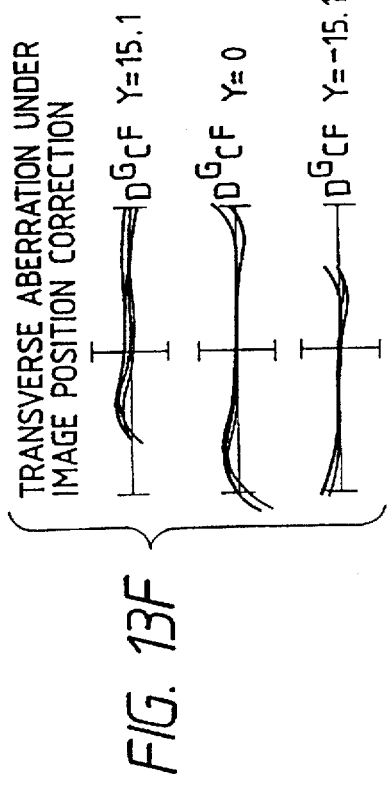
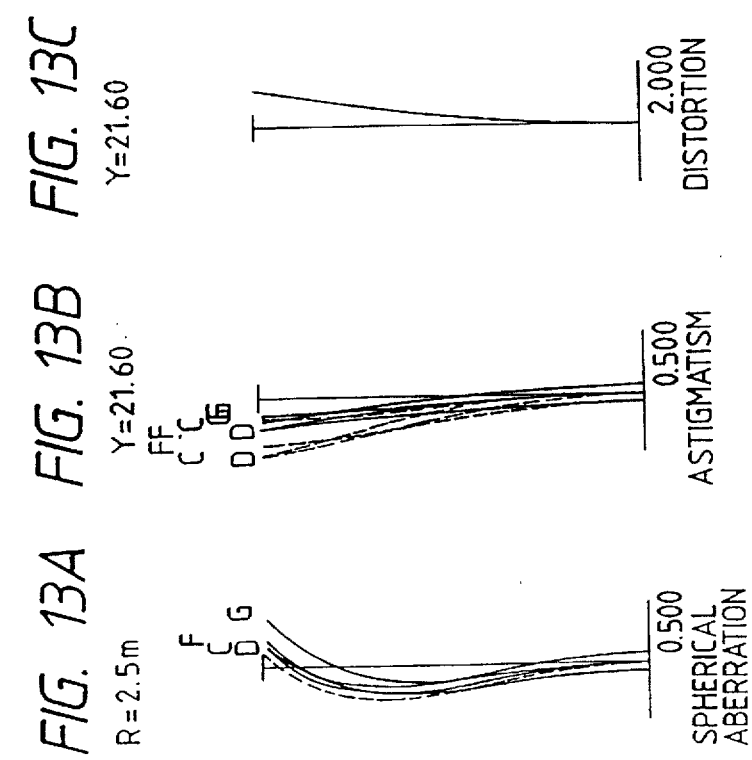
FIG. 13A  FIG. 13B  FIG. 13C
FIG. 13D
FIG. 13E
FIG. 13F S: APERTURE EFFICIENCY (VIGNETTING FACTOR)
C: FIELD ILLUMINATION RATIO
D: FIELD ILLUMINATION RATIO (TAKING ACCOUNT OF DISTORTION)

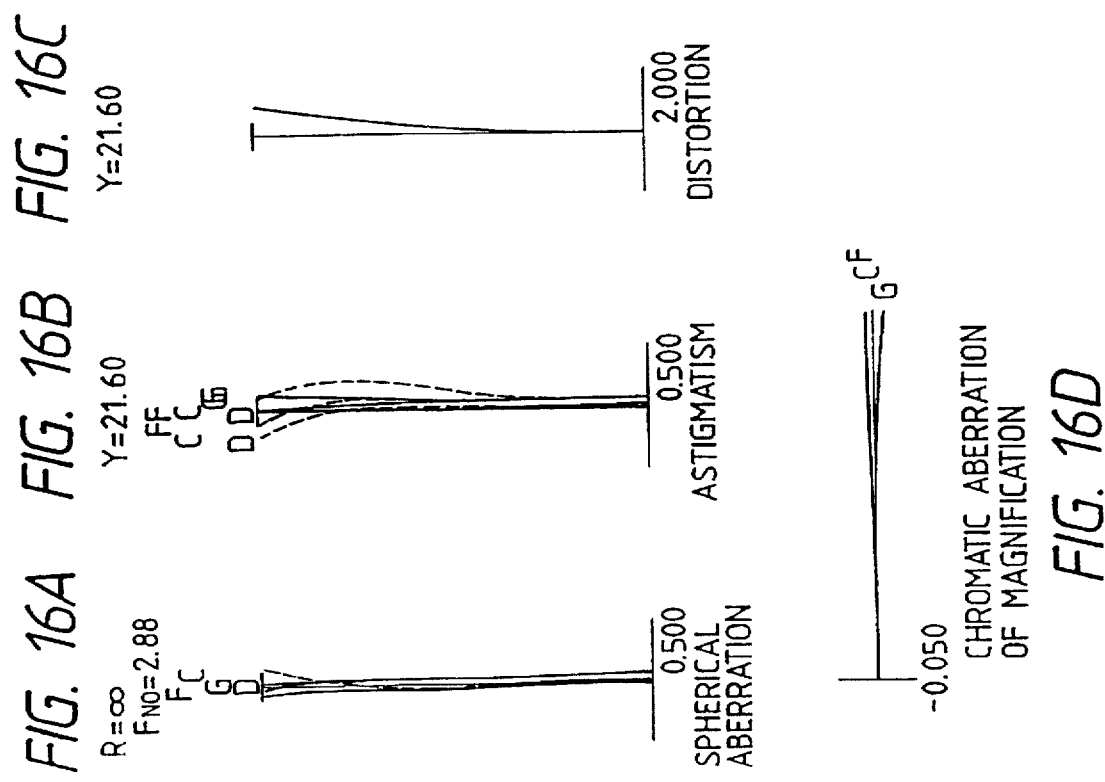
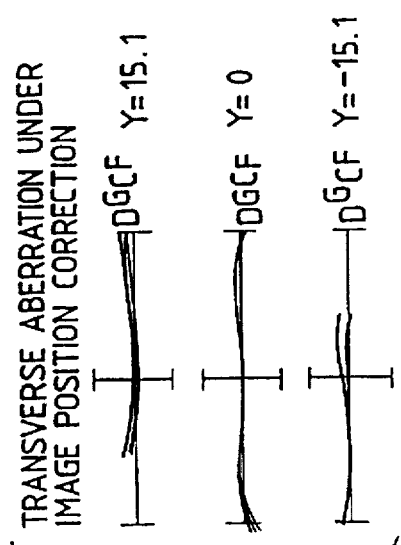

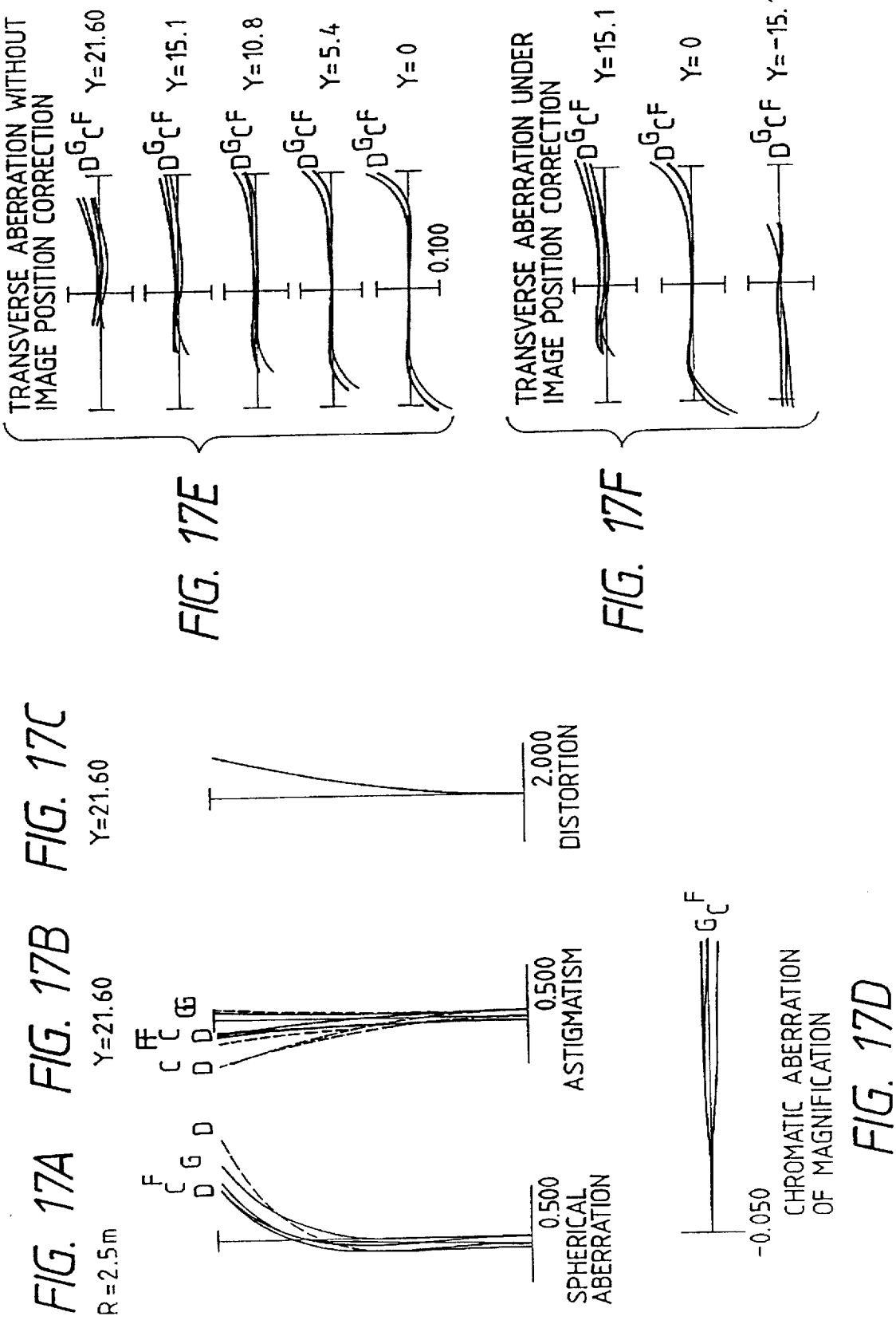

S: APERTURE EFFICIENCY (VIGNETTING FACTOR)
C: FIELD ILLUMINATION RATIO
D: FIELD ILLUMINATION RATIO (TAKING ACCOUNT OF DISTORTION)

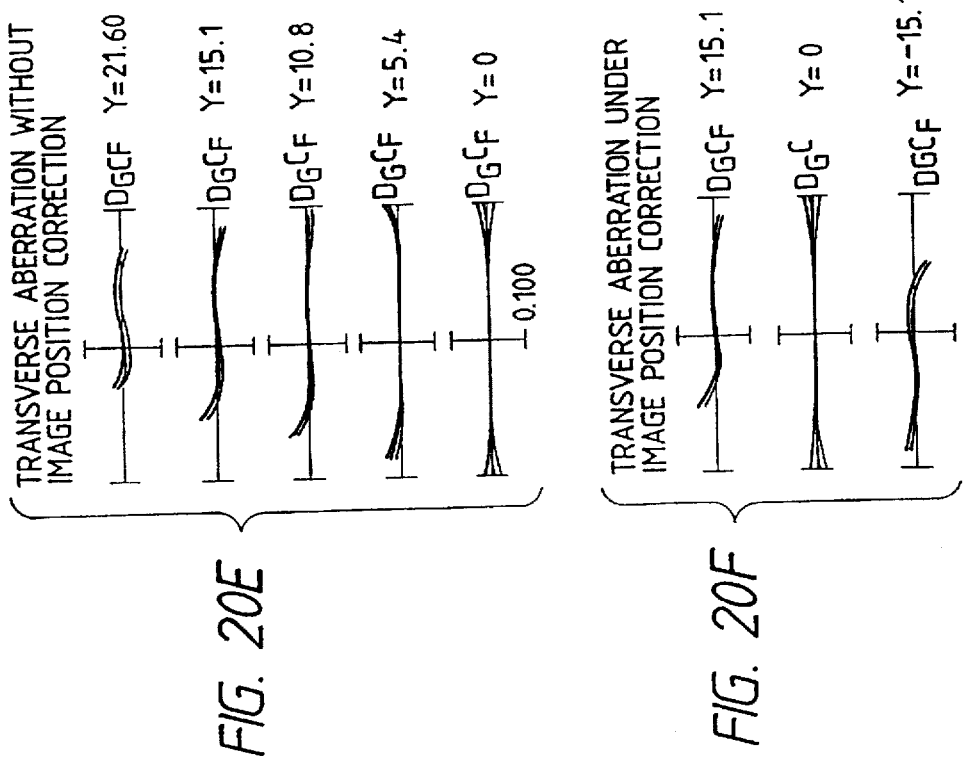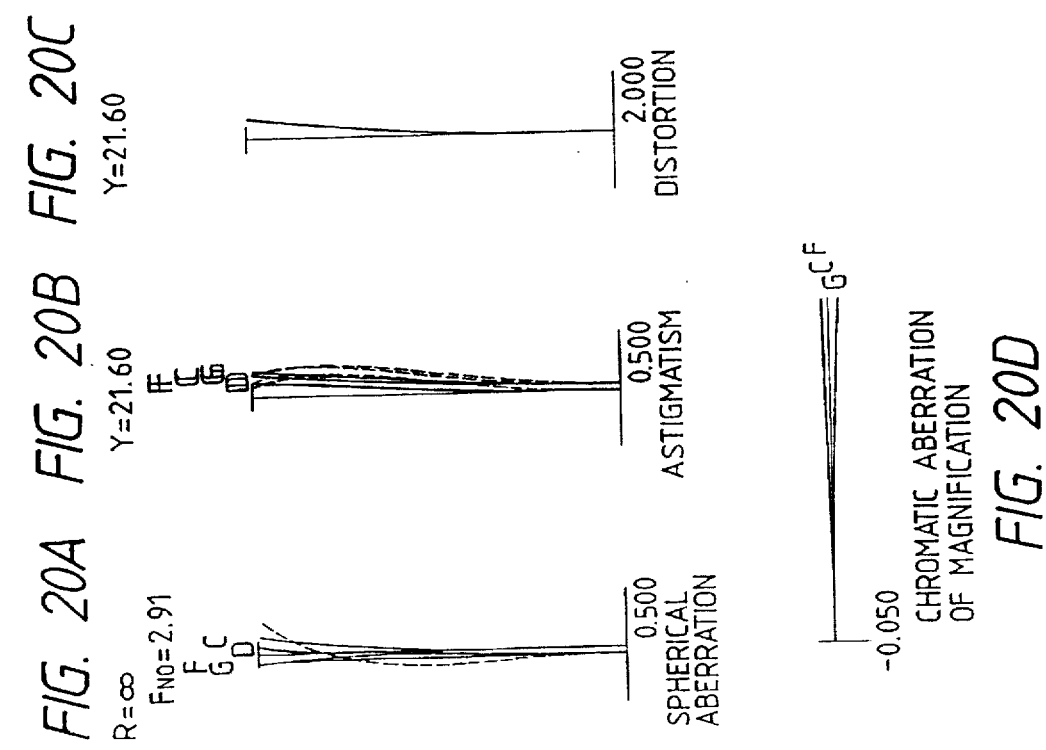

S: APERTURE EFFICIENCY (VIGNETTING FACTOR)
C: FIELD ILLUMINATION RATIO
D: FIELD ILLUMINATION RATIO (TAKING ACCOUNT OF DISTORTION)

OPTICAL SYSTEM CAPABLE OF CORRECTING IMAGE POSITION

This is a division of application Ser. No. 08/401,792 filed Mar. 10, 1995, now U.S. Pat. No. 5,646,779.

BACKGROUND OF THE INVENTION

1. Field of the Invention

The present invention relates to an optical system capable of correcting an image position (also referred to as an image position correcting optical system hereinafter) and, more particularly, to an objective lens system suitable for SLR cameras (Single-Lens Reflex cameras), electronic cameras, and video cameras.

2. Related Background Art

In the present specification, an operation for correcting any variation of an image position caused by a focusing operation, a camera shake, or the like by displacing a predetermined lens group in a direction Substantially perpendicular to the optical axis will be referred to as "image position correction". In particular, an operation for correcting any variation of an image position caused by a vibration of an optical system such as a camera shake, or the like by displacing a predetermined lens group in a direction substantially perpendicular to the optical axis will be referred to as "vibration reduction" or "vibration correction".

As a conventional image position correcting optical system of this type, an optical system disclosed in U.S. Pat. No. 4,978,205 is known.

The optical system disclosed in U.S. Pat. No. 4,978,205 has a large total lens length (the distance from a lens surface, closest to the object side in the optical system to the image plane), and is large in size.

As described above, the conventional image position correcting optical system is inconvenient for carrying due to its large total lens length, i.e., has poor portability. Since the optical system is large in size, it is heavy and hard to support (hold). Therefore, although the optical system originally aims at reducing camera shake, the camera shake increases since the optical system is hard to hold, resulting in a large variation of the image position.

In the optical system disclosed in U.S. Pat. No. 4,978,205, an aperture stop is arranged at a position closest to the image side in the optical system. Therefore, as a problem unique to a behind stop, an insufficient improvement of the marginal light amount ratio upon stopping-down of the aperture stop becomes undesirably outstanding. In the optical system disclosed in U.S. Pat. No. 4,978,205, since a lens group for attaining a focusing operation and a lens group for correcting an image position have large effective diameters, the size of a lens barrel increases in its radial direction, resulting in poor operability in a hand-held photographing operation.

SUMMARY OF THE INVENTION

It is, therefore, the first object of the present invention to provide a compact image position correcting optical system, which has a relatively small total lens length, and it is the second object to provide an image position correcting optical system, which can increase the marginal light amount upon stopping-down, and can decrease the effective diameters of a lens group for attaining a focusing operation and a lens group for correcting an image position.

In order to achieve the above objects, an image position correcting optical system according to one aspect of the present invention, comprises, in the following order from the object side:

a first lens group having a positive refractive power;

a second lens group having a negative refractive power; and a third lens group having a positive refractive power, wherein the third lens group has at least one positive lens and at least one negative lens, the second lens group is movable along an optical axis direction, the third lens group is movable in a direction substantially perpendicular to the optical axis, and the optical system satisfies:

$$0.25 < F1/FT < 0.46$$

where FT is the focal length of the optical system, and F1 is the focal length of the first lens group.

Also, in order to achieve the above objects, an image position correcting optical system according to another aspect of the present invention, comprises, in the following order from the object side:

a first lens group having a positive refractive power;

a second lens group having a negative refractive power; and a third lens group having a positive refractive power, wherein the second lens group is movable along an optical axis direction, the third lens group has an image position correction group which is movable in a direction substantially perpendicular to the optical axis, an aperture stop is disposed between the lens surface closest to the object side in the second lens group and the lens surface closest to the object side in the image position correction group, and the optical system satisfies:

$$-0.2 \leq \phi 23 \leq 0.002$$

where $\phi 23$ is the synthesized refractive power of the second and third lens groups.

In order to achieve the above objects, an image position correcting optical system according to still another aspect of the present invention, comprises, in the following order from the object side:

a first lens group having a positive refractive power;

a second lens group having a negative refractive power; and a third lens group having a positive refractive power, wherein the second lens group is movable along an optical axis direction, the third lens group is movable in a direction substantially perpendicular to the optical axis, an aperture stop is disposed between the lens surface closest to the object side in the second lens group and the lens surface closest to the object side in the third lens group, and the optical system satisfies:

$$-0.2 \leq \phi 23 \leq 0.002$$

where $\phi 23$ is the synthesized refractive power of the second and third lens groups.

Furthermore, in order to increase the marginal light amount upon stopping-down and to achieve size reduction, an objective lens system according to still another aspect of the present invention, comprises, in the following order from the object side:

a first positive lens unit; and a second positive lens unit, wherein the second positive lens unit has, in the following order from the object side, a first subunit having a positive refractive power, a second subunit having a negative refractive power, and a third subunit having a positive refractive power, the second subunit is movable in an optical axis direction, and the objective lens system satisfies:

$$-0.2 \leq \phi 23 \leq 0.002$$

where $\phi 23$ is the synthesized refractive power of the second and third subunits.

BRIEF DESCRIPTION OF THE DRAWINGS

FIGS. 5A to 5F are graphs showing various aberrations in an infinity focusing state in the second embodiment;

FIGS. 6A to 6F are graphs showing various aberrations in a closest-distance focusing state in the second embodiment;

FIGS. 8A to 8F are graphs showing various aberrations in an infinity focusing state in the third embodiment;

FIGS. 9A to 9F are graphs showing various aberrations in a closest-distance focusing state in the third embodiment;

FIGS. 12A to 12F are graphs showing various aberrations in an infinity focusing state in the fourth embodiment;

FIGS. 13A to 13F are graphs showing various aberrations in a closest-distance focusing state in the fourth embodiment;

FIGS. 16A to 16F are graphs showing various aberrations in an infinity focusing state in the fifth embodiment;

FIGS. 17A to 17F are graphs showing various aberrations in a closest-distance focusing state in the fifth embodiment;

FIGS. 20A to 20F are graphs showing various aberrations in an infinity focusing state in the sixth embodiment;

DESCRIPTION OF THE PREFERRED EMBODIMENTS

The preferred embodiments of the present invention will be described hereinafter with reference to the accompanying drawings. The first to third embodiments of the present invention will be described first with reference to FIGS. 1 to 9F.

Figure 1:
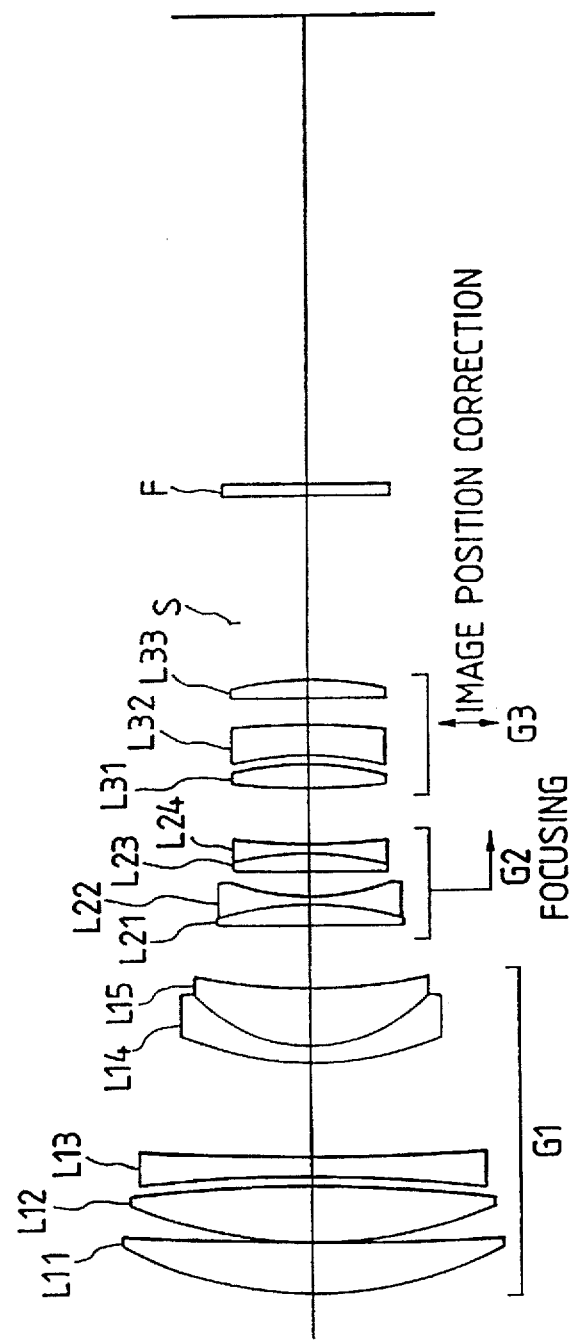
FIG. 1 is a view showing the arrangement of an image position correcting optical system according to a first embodiment of the present invention.
Figure 2:
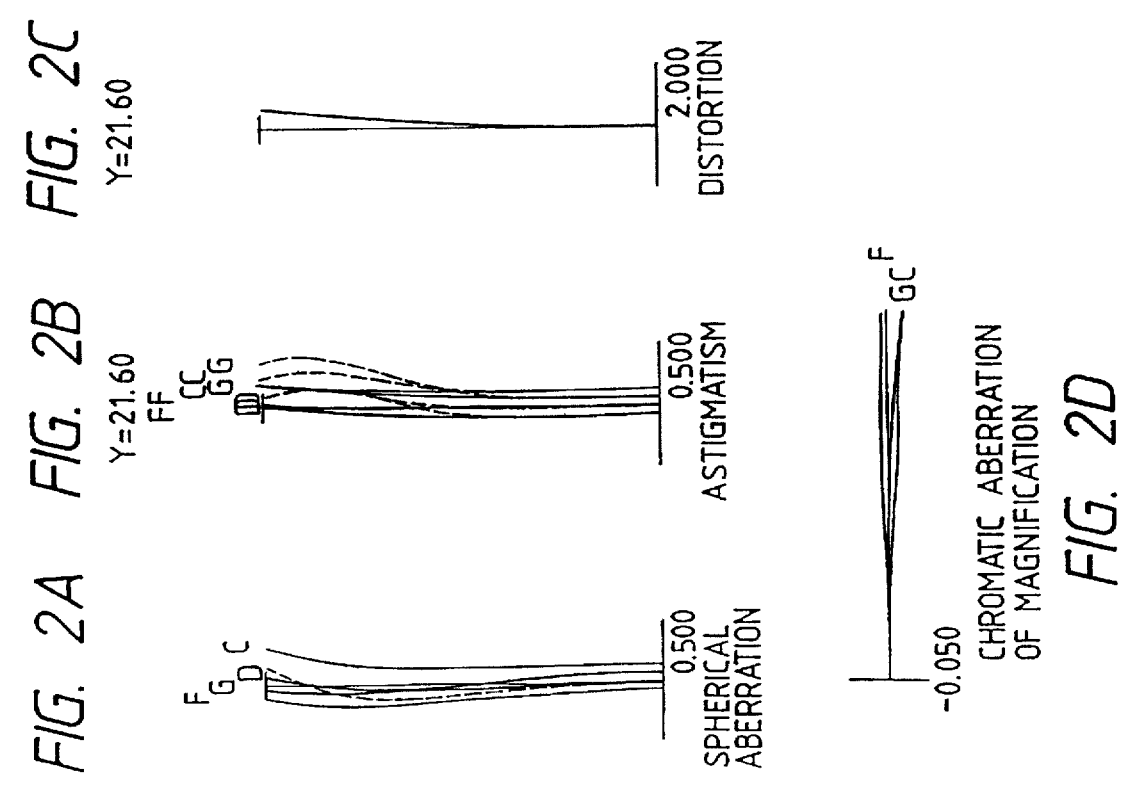
FIGS. 2A to 2F are graphs showing various aberrations in an infinity focusing state in the first embodiment.
Figure 3:
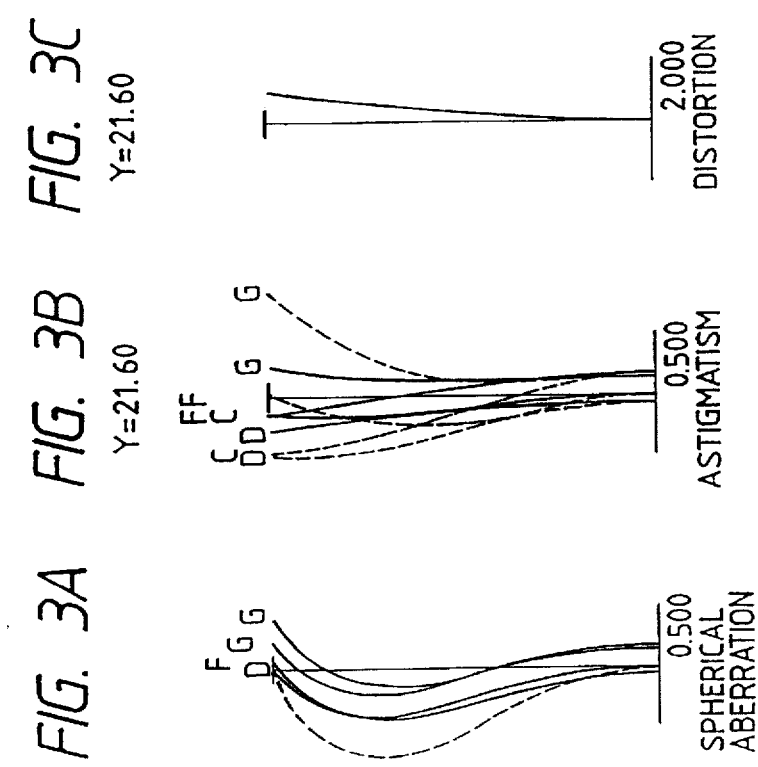
FIGS. 3A to 3F are graphs showing various aberrations in a closest-distance focusing state in the first embodiment.
Figure 4:
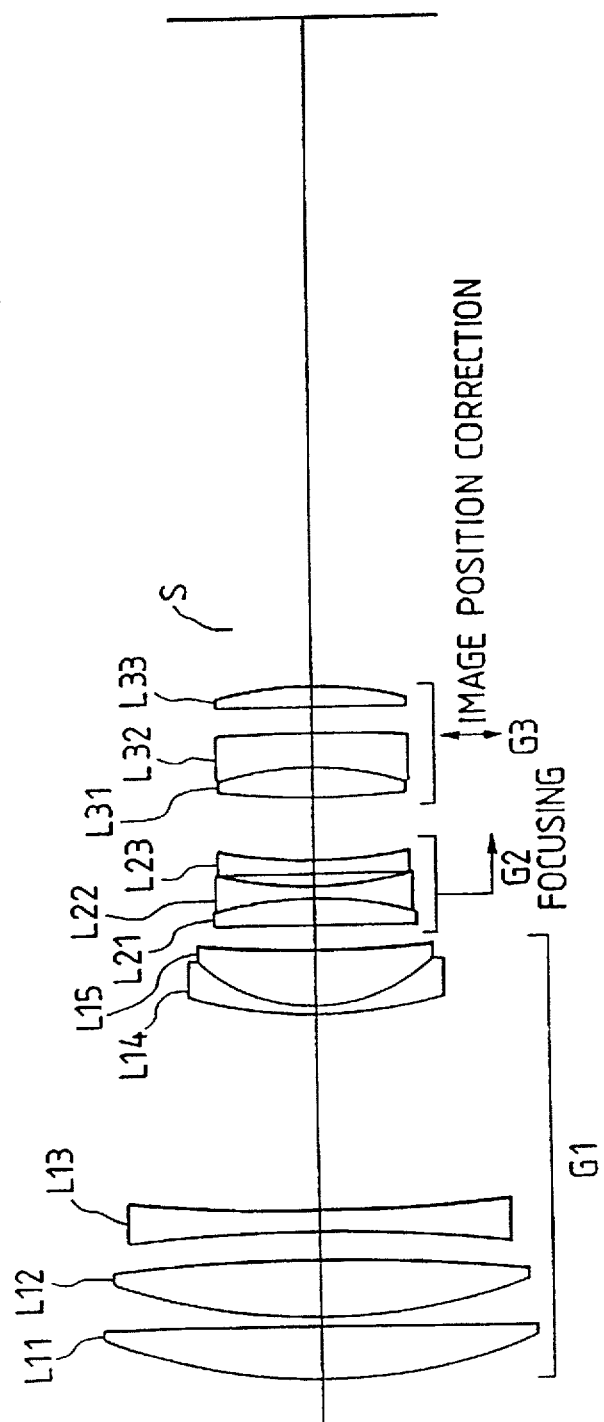
FIG. 4 is a view showing the arrangement of an image position correcting optical system according to a second embodiment of the present invention.
Figure 7:
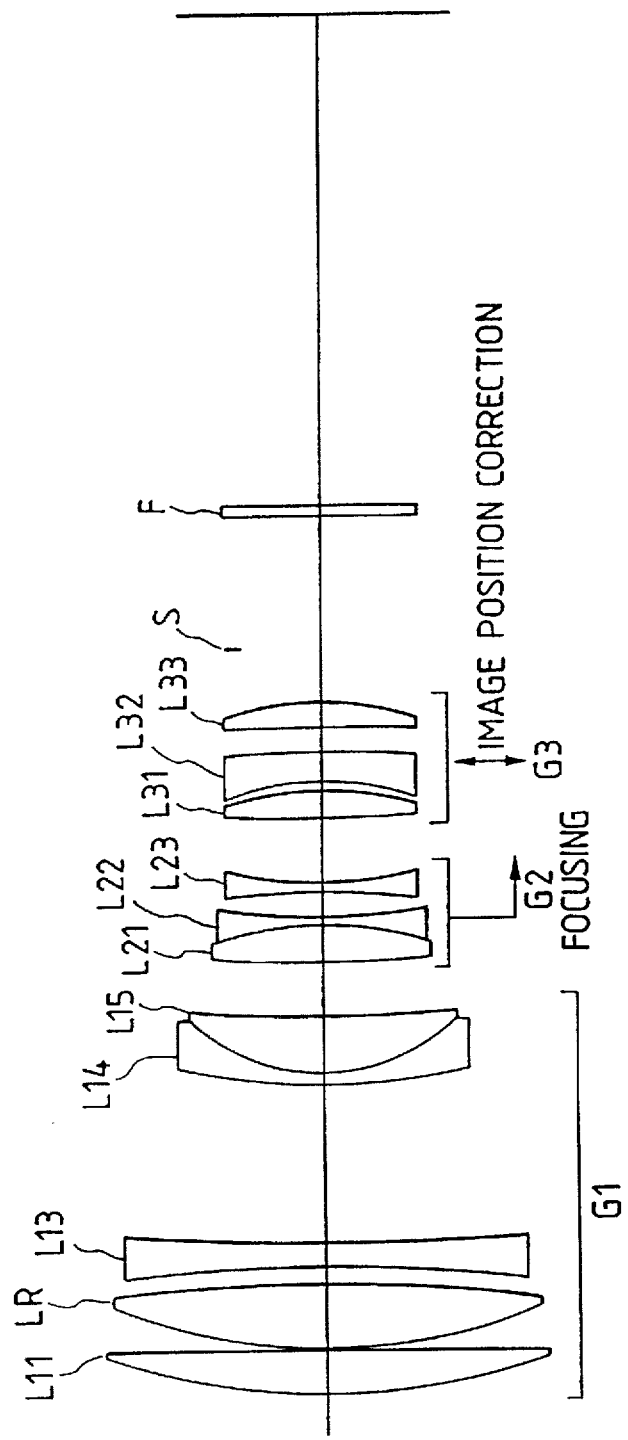
FIG. 7 is a view showing the arrangement of an image position correcting optical system according to a third embodiment of the present invention.

As shown in FIGS. 1, 4, and 7, an image position correcting optical system according to the first to third embodiments comprises, in the following order from the object side, a first lens group G1 having a positive refractive power, a second lens group G2 having a negative refractive power, and a third lens group G3 having a positive refractive power. The second lens group G2 is movable along the optical axis, and the third lens group G3 is movable in a direction substantially perpendicular to the optical axis. By moving the second lens group G2 in the optical axis direction, a focusing operation for an object from the infinity to the closest distance can be attained. By moving the third lens group G3 in the direction substantially perpendicular to the optical axis, an object image formed on the image plane can be displaced.

In the image position correcting optical system of the first to third embodiments, since a focal length F1 of the first lens group G1 is set to be small within a predetermined range with respect to a focal length FT of the entire image position correcting optical system, the total lens length can be shortened. More specifically, the image position correcting optical system of the first to third embodiments satisfies conditional formula (1) below:

$$0.25 < F1/FT < 0.46 \qquad (1)$$

where

F1: the focal length of the first lens group G1

FT: the focal length of the entire optical system.

As described above, conditional formula (1) defines an appropriate range as to the ratio between the focal lengths of the first lens group G1 and the entire optical system.

When the ratio is smaller than the lower limit value of conditional formula (1), the variation of spherical aberration upon focusing increases. Such a small ratio is not preferable.

On the contrary, when the ratio exceeds the upper limit value of conditional formula (1), the total lens length becomes too large, against the object of the present invention. For this reason, such a large ratio is not preferable, either.

In order to further improve imaging characteristics, the optical system preferably satisfies conditional formulas (2) and (3) below in addition to the above-mentioned arrangement and conditional formulas:

$$1.40 < n11 < 1.75 \quad (2)$$

$$50 < v11 < 100 \quad (3)$$

where n11: the refractive index of an optical member L11, closest to the object side, in the first lens group G1, v11: the Abbe's number of the optical member L11, closest to the object side, in the first lens group G1.

Note that the optical member L11, closest to the object side, in the first lens group G1 consists of an optical glass material, and the values of the refractive index n11 and the Abbe's number v11 of the optical glass material correspond to those for the d-line ($\lambda$=587.6 nm).

When n11 is smaller than the lower limit value of conditional formula (2), the curvature of spherical aberration becomes too large, and such small n11 is not preferable.

On the contrary, when n11 exceeds the upper limit value of conditional formula (2), existing optical glass with such n11 has v11 smaller than the lower limit value of conditional formula (3). For this reason, such large n11 is not preferable.

When v11 is smaller than the lower limit value of conditional formula (3), the second-order chromatic aberration increases, and such small v11 is not preferable.

When v11 exceeds the upper limit value of conditional formula (3), no problem is posed. However, since v11 of existing optical glass never exceeds the upper limit value of conditional formula (3), "100" is set as a practical upper limit Abbe's number.

In the present invention, the lens L11, closest to the object side, in the first lens group G1 preferably uses optical glass with high durability (high wear resistance and high chemical durability) since the final product can then be used in any environment. In order to obtain such high durability and high imaging performance, the optical system preferably satisfies conditional formulas (4) and (5) as to the ranges corresponding to conditional formulas (2) and (3):

$$1.45 < n11 < 1.64 \quad (4)$$

$$62 < v11 < 100 \quad (5)$$

When n11 is smaller than the lower limit value of conditional formula (4), the durability such as wear resistance, chemical durability, and the like of the lens L11, closest to the object side, in the first lens group G1 deteriorates. Thus, such small n11 is not preferable.

On the contrary, when n11 exceeds the upper limit value of conditional formula (4), existing optical glass with such n11 has v11 smaller than the lower limit value of conditional formula (5). For this reason, such large n11 is not preferable.

When v11 is smaller than the lower limit value of conditional formula (5), the second-order chromatic aberration increases, and such large v11 is not preferable. As described above, the lower limit value of conditional formula (5) is set to further improve imaging performance in terms of the second-order chromatic aberration by increasing the lower limit value of conditional formula (3).

As for the upper limit value of conditional formula (5), "100" is set as a practical upper limit Abbe's number as in the upper limit value of conditional formula (3).

In order to further improve the imaging performance, the optical system preferably satisfies conditional formula (6) below:

$$0.2 < f11/FT < 2 \quad (6)$$

where f11: the focal length of the lens L11, closest to the object side, in the first lens group G1.

When f11/FT is smaller than the lower limit value of conditional formula (6), the refractive power of the lens L11, closest to the object side, in the first lens group G1 is too strong, and the close-distance variation of the curvature of spherical aberration (i.e., a variation upon focusing to a close distance) becomes large when the first lens group G1 is constituted by a small number of lenses. Thus, such small f11/FT is not preferable.

On the other hand, when f11/FT exceeds the upper limit value of conditional formula (6), the refractive power of the lens L11, closest to the object side, in the first lens group G1 is too weak, and the total lens length increases. For this reason, such large f11/FT is not preferable, either.

In order to further improve the imaging performance, the optical system preferably satisfies conditional formula (7) below:

$$-1 < q < 3 \quad (7)$$

where q: the shape factor of the lens L11, closest to the object side, in the first lens group G1.

Note that the shape factor q of the lens L11 is expressed by equation (a) below:

$$q = (r2 + r1)/(r2 - r1) \quad (a)$$

where r1 is the radius of curvature of a surface, on the object side, of the lens L11, and r2 is the radius of curvature of a surface, on the image side, of the lens L11.

When q is smaller than the lower limit value of conditional formula (7), the astigmatism increases, and such small q is not preferable.

On the contrary, when q exceeds the lower limit value of conditional formula (7), if the first lens group G1 is constituted by a small number of lenses, it is difficult to sufficiently correct the curvature of spherical aberration, and such large q is not preferable.

In order to further improve the imaging performance, the optical system preferably satisfies conditional formula (8) below:

$$0.1 < \phi31/F3 < 0.3 \quad (8)$$

where

F3: the focal length of the third lens group G3, $\phi31$: the effective diameter of a surface, on the object side, of a lens L31, closest to the object side, in the third lens group G3.

When $\phi31/F3$ is smaller than the lower limit value of conditional formula (8), the total lens length increases, and such small $\phi31/F3$ is not preferable.

On the contrary, when $\phi31/F3$ exceeds the upper limit value of conditional formula (8), if the third lens group G3 is constituted by a small number of lenses, it becomes difficult to reduce the flare upon image position correction, and such large $\phi31/F3$ is not preferable.

In order to further improve image position correction performance (imaging performance upon image position correction) while constituting the third lens group G3 with a small number of lenses, the third lens group G3 preferably satisfies conditional formula (9) below:

$$0.1 < \phi31/f31 < 0.7 \quad (9)$$

where f31: the focal length of the lens L31, closest to the object side, in the third lens group G3.

When $\phi 31/f31$ is smaller than the lower limit value of conditional formula (9), the imaging characteristics upon image position correction become asymmetrical, and such small $\phi 31/f31$ is not preferable.

On the contrary, when $\phi 31/f31$ exceeds the upper limit value of conditional formula (9), a flare is generated upon image position correction, and such large $\phi 31/f31$ is not preferable, either.

In order to further improve image position correction performance, the optical system preferably satisfies conditional formula (10) below:

$$-2<Q<1 \tag{10}$$

where

Q: the shape factor of the lens L31, closest to the object side, in the third lens group G3.

Note that the shape factor Q of the lens L31 is expressed by equation (b) below:

$$Q=(R2+R1)/(R2-R1) \tag{b}$$

where R1 is the radius of curvature of a surface, on the object side, of the lens L31, and R2 is the radius of curvature of a surface, on the image side, of the lens L31.

When Q is smaller than the lower limit value of conditional formula (10), a flare is generated upon image position correction, and such small Q is not preferable.

On the contrary, when Q exceeds the upper limit value of conditional formula (10), the chromatic aberration of magnification becomes too large as a normal lens, and such large Q is not preferable, either.

The third lens group G3 is preferably utilized not only for correcting a mechanical vibration such as a variation of an image position upon focusing but also for correcting a variation of an image position caused by a camera shake (i.e., caused by a vibration of the optical system), since the optical system can be easily handled while maintaining high imaging performance.

The arrangements of the first to third embodiments will be explained below.

[First Embodiment]

FIG. 1 is a view showing the arrangement of an image position correcting optical system according to the first embodiment of the present invention.

The image position correcting optical system shown in FIG. 1 comprises, in the following order from the object side: a first lens group G1 consisting of a positive meniscus lens L11 with a convex surface facing the object side, a biconvex lens L12, a biconcave lens L13, and a cemented lens of a negative meniscus lens L14 with a convex surface facing the object side and a positive meniscus lens L15 with a convex surface facing the object side; a second lens group G2 consisting of a cemented lens of a plano-convex lens L21 with a convex surface facing the image side and a biconcave lens L22, and a cemented lens of a positive meniscus lens L23 with a concave surface facing the object side and a biconcave lens L24; and a third lens group G3 consisting of a biconvex lens L31, a negative meniscus lens L32 with a concave surface facing the object side, and a positive meniscus lens L33 with a concave surface facing the object side.

Note that an aperture stop S and a detachable filter F are arranged on the image side of the third lens group G3.

FIG. 1 shows the positions of the respective lens groups in an infinity focusing state, and a focusing operation for a close-distance object is attained by moving the second lens group G2 toward the image side. The third lens group G3 is appropriately moved by a driving actuator or mechanism 10 as a displacement means in a direction substantially perpendicular to the optical axis, thereby correcting a fluctuation of an image position caused by a vibration of the optical system.

Table 1 below summarizes the data values of the first embodiment of the present invention. In Table 1, FT is the focal length in the infinity focusing state, and $F_{NO}$ is the F-number in the infinity focusing state. Furthermore, numerals in the leftmost column represent the order of lens surfaces from the object side, r is the radius of curvature of each lens surface, d is the lens surface interval, and n and ν are respectively the refractive index and Abbe's number for the d-line (λ=587.6 nm).

TABLE 1

| FT = 294 | | $F_{NO}$ = 4.5 | |
|---|---|---|---|
| r | d | ν | n |
| 1 | 70.6476 | 8.800 | 65.77 | 1.46450 |
| 2 | 823.9535 | 0.100 | | |
| 3 | 81.1328 | 9.800 | 82.52 | 1.49782 |
| 4 | −265.3947 | 2.100 | | |
| 5 | −232.0774 | 3.100 | 35.19 | 1.74950 |
| 6 | 335.5017 | 17.700 | | |
| 7 | 57.0005 | 2.400 | 53.72 | 1.69350 |
| 8 | 26.0214 | 11.200 | 82.52 | 1.49782 |
| 9 | 104.3768 | (d9 = variable) | | |
| 10 | ∞ | 3.500 | 31.62 | 1.75692 |
| 11 | −57.4529 | 1.500 | 60.03 | 1.64000 |
| 12 | 40.2830 | 4.900 | | |
| 13 | −1346.3912 | 3.200 | 45.87 | 1.54814 |
| 14 | −52.6093 | 1.500 | 52.30 | 1.74810 |
| 15 | 143.8299 | (d15 = variable) | | |
| 16 | 144.3037 | 4.000 | 65.77 | 1.46450 |
| 17 | −59.8882 | 1.800 | | |
| 18 | −44.1039 | 5.500 | 25.50 | 1.80458 |
| 19 | −201.3022 | 4.800 | | |
| 20 | −791.2906 | 3.500 | 27.83 | 1.69911 |
| 21 | −57.5793 | 10.000 | | |
| 22 | ∞ | 23.000 | | |
| 23 | ∞ | 2.000 | 64.10 | 1.51680 |
| 24 | ∞ | 83.9589 | | |

| (Variable Interval Upon Focusing) | | |
|---|---|---|
| | Infinity | Closest Distance (2 m) |
| d9 | 11.06595 | 17.59167 |
| d15 | 10.52519 | 3.99947 |

(Condition Corresponding Values)

FT = 294.0
f11 = 165.7
F3 = 116.7
F1 = 104.0
r1 = 70.6476
r2 = 823.9535
R1 = 144.3037
R2 = −59.8882
$\phi 31$ = 27.60
f31 = 91.9
total lens length = 229.95
(1) F1/FT = 0.354
(2) n11 = 1.465
(3) ν11 = 65.77
(6) f11/FT = 0.564
(7) q = 1.188
(8) $\phi 31/F3$ = 0.237
(9) $\phi 31/f31$ = 0.300
(10) Q = −0.413

TABLE 1-continued (Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

FIGS. 2A to 2F and FIGS. 3A to 3F are graphs showing various aberrations in the infinity focusing state and the closest-distance (2 m) focusing state. In these graphs, Y is the image height, D is the d-line ($\lambda$=587.6 nm), C is the C-line ($\lambda$=656.3 nm), F is the F-line ($\lambda$=486.1 nm), and G is the g-line ($\lambda$=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

0[Second Embodiment]

FIG. 4 is a view showing the arrangement of an image position correcting optical system according to the second embodiment of the present invention.

The image position correcting optical system shown in FIG. 4 comprises, in the following order from the object side: a first lens group G1 consisting of a positive meniscus lens L11 with a convex surface facing the object side, a biconvex lens L12, a biconcave lens L13, and a cemented lens of a negative meniscus lens L14 with a convex surface facing the object side and a positive meniscus lens L15 with a convex surface facing the object side; a second lens group G2 consisting of a cemented lens of a positive meniscus lens L21 with a concave surface facing the object side and a biconcave lens L22, and a biconcave lens L23; and a third lens group G3 consisting of a biconvex lens L31, a negative meniscus lens L32 with a concave surface facing the object side, and a biconvex lens L33.

Note that an aperture stop S is arranged on the image side of the third lens group G3. A filter (not shown) using a detachable metal member is arranged on the object side of the first lens group G1.

FIG. 4 shows the positions of the respective lens groups in an infinity focusing state, and a focusing operation for a close-distance object is attained by moving the second lens group G2 toward the image side. The third lens group G3 is appropriately moved by a driving actuator (not shown) as a displacement means in a direction substantially perpendicular to the optical axis, thereby correcting a fluctuation of an image position caused by a vibration of the optical system.

Table 2 below summarizes the data values of the second embodiment of the present invention. In Table 2, FT is the focal length in the infinity focusing state, and $F_{NO}$ is the F-number in the infinity focusing state. Furthermore, numerals in the leftmost column represent the order of lens surfaces from the object side, r is the radius of curvature of each lens surface, d is the lens surface interval, and n and v are respectively the refractive index and Abbe's number for the d-line ($\lambda$=587.6 nm).

TABLE 2

FT = 294    $F_{NO}$ = 4.1

| | r | d | v | n |
|---|---|---|---|---|
| 1 | 96.1521 | 9.000 | 69.98 | 1.51860 |
| 2 | 2192.0910 | 1.800 | | |
| 3 | 100.6163 | 10.000 | 82.52 | 1.49782 |
| 4 | −401.9355 | 5.400 | | |
| 5 | −290.6599 | 4.000 | 31.62 | 1.75692 |
| 6 | 385.4505 | 35.600 | | |
| 7 | 75.9182 | 1.900 | 60.03 | 1.64000 |
| 8 | 29.0411 | 10.000 | 82.52 | 1.49782 |
| 9 | 181.9675 | (d9 = variable) | | |
| 10 | −474.9897 | 4.700 | 31.62 | 1.75692 |
| 11 | −57.5926 | 2.500 | 60.03 | 1.64000 |
| 12 | 65.5807 | 2.200 | | |
| 13 | −1460.4334 | 2.500 | 52.30 | 1.74810 |
| 14 | 76.1382 | (d14 = variable) | | |
| 15 | 180.9306 | 4.500 | 65.77 | 1.46450 |
| 16 | −56.3652 | 0.548 | | |
| 17 | −45.6823 | 6.000 | 25.50 | 1.80458 |
| 18 | −268.6981 | 4.300 | | |
| 19 | 1546.8469 | 4.000 | 27.61 | 1.75520 |
| 20 | −66.6445 | 10.800 | | |
| 21 | ∞ | 109.465 | | |

(Variable Interval Upon Focusing)

| | Infinity | Closest Distance (2.5 m) |
|---|---|---|
| d9 | 4.51604 | 11.92342 |
| d14 | 11.67843 | 4.27105 |

(Condition Corresponding Values)

FT = 294.0
f11 = 193.6
F3 = 116.6
F1 = 125.5
r1 = 96.1521
r2 = 2192.091
R1 = 180.9306
R2 = −56.3652
$\phi$31 = 32.00
f31 = 93.1
total lens length = 245.41
(1) F1/FT = 0.427
(2) n11 = 1.519
(3) v11 = 69.98
(6) f11/FT = 0.659
(7) q = 1.092
(8) $\phi$31/F3 = 0.274
(9) $\phi$31/f31 = 0.344
10) Q = −0.525

(Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

FIGS. 5A to 5F and FIGS. 6A to 6F are graphs showing various aberrations in the infinity focusing state and the closest-distance (2.5 m) focusing state. In these graphs, Y is the image height. D is the d-line ($\lambda$=587.6 nm), C is the C-line ($\lambda$=656.3 nm), F is the F-line ($\lambda$=486.1 nm), and G is the G-line ($\lambda$=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

[Third Embodiment]

FIG. 7 is a view showing the arrangement of an image position correcting optical system according to the third embodiment of the present invention.

The image position correcting optical system shown in FIG. 7 comprises, in the following order from the object side: a first lens group G1 consisting of a positive meniscus lens L11 with a convex surface facing the object side, a biconvex lens L12, a biconcave lens L13, and a cemented lens of a negative meniscus lens L14 with a convex surface facing the object side and a positive meniscus lens L15 with a convex surface facing the object side; a second lens group G2 consisting of a cemented lens of a biconvex lens L21 and a biconcave lens L22, and a biconcave lens L23; and a third lens group G3 consisting of a biconvex lens L31, a negative meniscus lens L32 with a concave surface facing the object side, and a positive meniscus lens L33 with a concave surface facing the object side.

Note that an aperture stop S and a detachable filter F are arranged on the image side of the third lens group G3.

FIG. 7 shows the positions of the respective lens groups in an infinity focusing state, and a focusing operation for a close-distance object is attained by moving the second lens group G2 toward the image side. The third lens group G3 is appropriately moved by a driving actuator (not shown) as a displacement means in a direction substantially perpendicular to the optical axis, thereby correcting a fluctuation of an image position caused by a vibration of the optical system.

Table 3 below summarizes the data values of the third embodiment of the present invention. In Table 3, FT is the focal length in the infinity focusing state, and $F_{NO}$ is the F-number in the infinity focusing state. Furthermore, numerals in the leftmost column represent the order of lens surfaces from the object side, r is the radius of curvature of each lens surface, d is the lens surface interval, and n and $\nu$ are respectively the refractive index and Abbe's number for the d-line ($\lambda$=587.6 nm).

TABLE 3

FT = 300   $F_{NO}$ = 4.1

| | r | d | $\nu$ | n |
|---|---|---|---|---|
| 1 | 100.0816 | 8.200 | 65.77 | 1.46450 |
| 2 | 12925.7000 | 0.100 | | |
| 3 | 88.4396 | 10.700 | 82.52 | 1.49782 |
| 4 | −375.6027 | 3.500 | | |
| 5 | −314.3022 | 4.300 | 31.62 | 1.75692 |
| 6 | 376.0759 | 29.500 | | |
| 7 | 117.6603 | 2.000 | 60.03 | 1.64000 |
| 8 | 33.3901 | 10.000 | 82.52 | 1.49782 |
| 9 | 349.1704 | (d9 = variable) | | |
| 10 | 241.3745 | 6.000 | 31.62 | 1.75692 |
| 11 | −59.9463 | 1.800 | 67.87 | 1.59319 |
| 12 | 101.3219 | 4.100 | | |
| 13 | −146.0549 | 1.800 | 43.35 | 1.84042 |
| 14 | 62.0532 | (d14 = variable) | | |
| 15 | 223.5495 | 5.000 | 69.98 | 1.51860 |
| 16 | −60.3073 | 1.600 | | |
| 17 | −43.2315 | 5.500 | 25.50 | 1.80458 |
| 18 | −325.5062 | 4.400 | | |
| 19 | −2967.4938 | 4.500 | 28.19 | 1.74000 |
| 20 | −56.5331 | 10.000 | | |
| 21 | ∞ | 23.700 | | |
| 22 | ∞ | 2.000 | 64.10 | 1.51680 |
| 23 | ∞ | 88.769 | | |

(Variable Interval Upon Focusing)

| | Infinity | Closest Distance (2.5 m) |
|---|---|---|
| d9 | 9.46857 | 17.84835 |
| d14 | 12.09228 | 3.71250 |

(Condition Corresponding Values)

FT = 300.2
f11 = 217.1
F3 = 118.7
F1 = 133.0
r1 = 100.082
r2 = 12925.7
R1 = 223.5495
R2 = −60.3073
$\phi$31 = 31.40
f31 = 92.1
total lens length = 249.03
(1) F1/FT = 0.443
(2) n11 = 1.465
(3) $\nu$11 = 65.77
(6) f11/FT = 0.723
(7) q = 1.016
(8) $\phi$31/F3 = 0.265
(9) $\phi$31/f31 = 0.341
(10) Q = −0.575

(Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

FIGS. 8A to 8F and FIGS. 9A to 9F are graphs showing various aberrations in the infinity focusing state and the closest-distance (2.5 m) focusing state. In these graphs, Y is the image height, D is the d-line ($\lambda$=587.6 nm), C is the C-line (λ=656.3 nm), F is the F-line (λ=486.1 nm), and G is the g-line (λ=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

In each of the above embodiments, the aperture stop is arranged on the image side of the third lens group G3. Alternatively, the aperture stop may be arranged on the object side of the third lens group G3.

In each of the above embodiments, an image position correction of 1 mm is performed on the image plane. However, it is possible to perform image position correction of more than or less than 1 mm, as a matter of course.

As described above, according to the first to third embodiments of the present invention, an image position correcting optical system, which can shorten the total lens length, has high durability against weather, and has high imaging performance not only in a normal use but also upon image position correction, can be realized.

The fourth to sixth embodiments of the present invention will be described below with reference to FIGS. 10 to 23.

Figure 10:
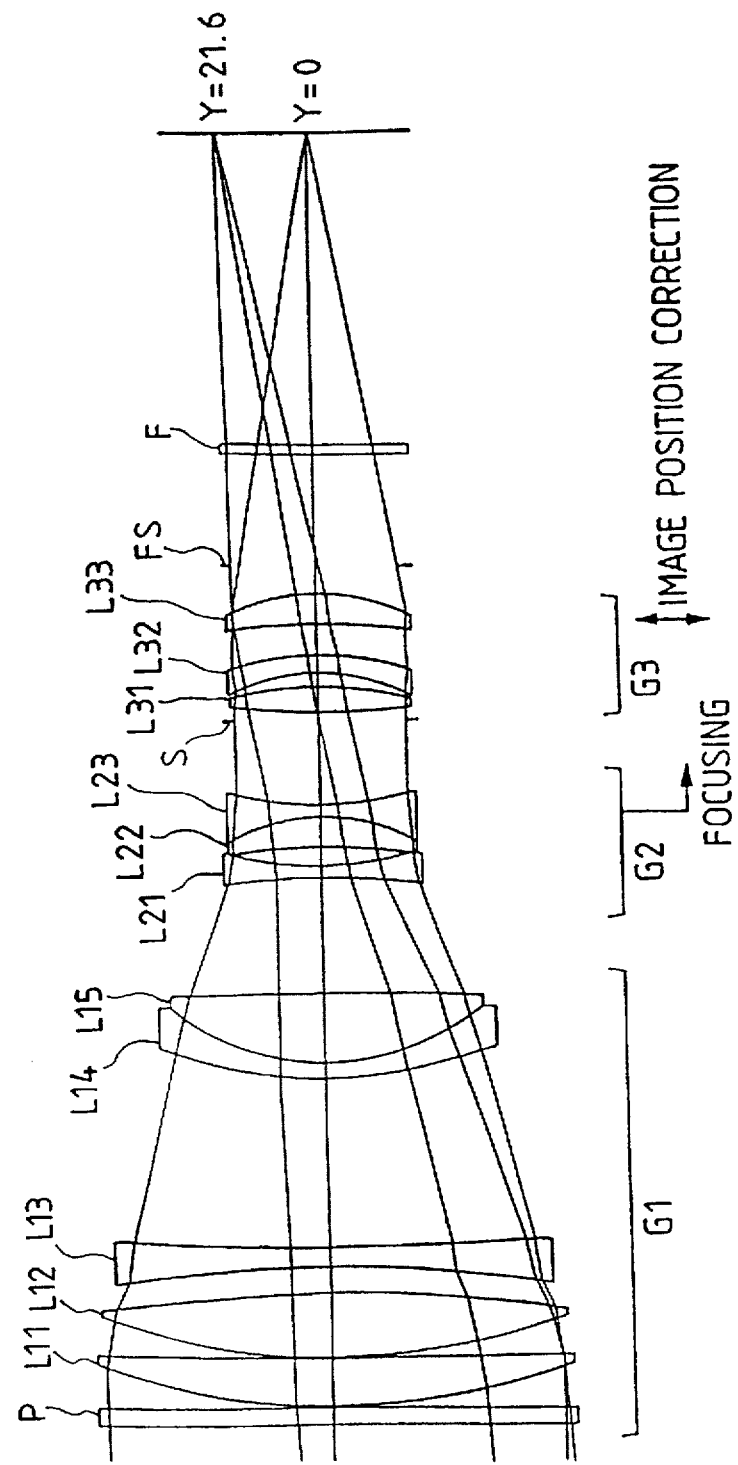
FIG. 10 is a view showing the arrangement of an image position correcting optical system according to a fourth embodiment of the present invention.
Figure 14:
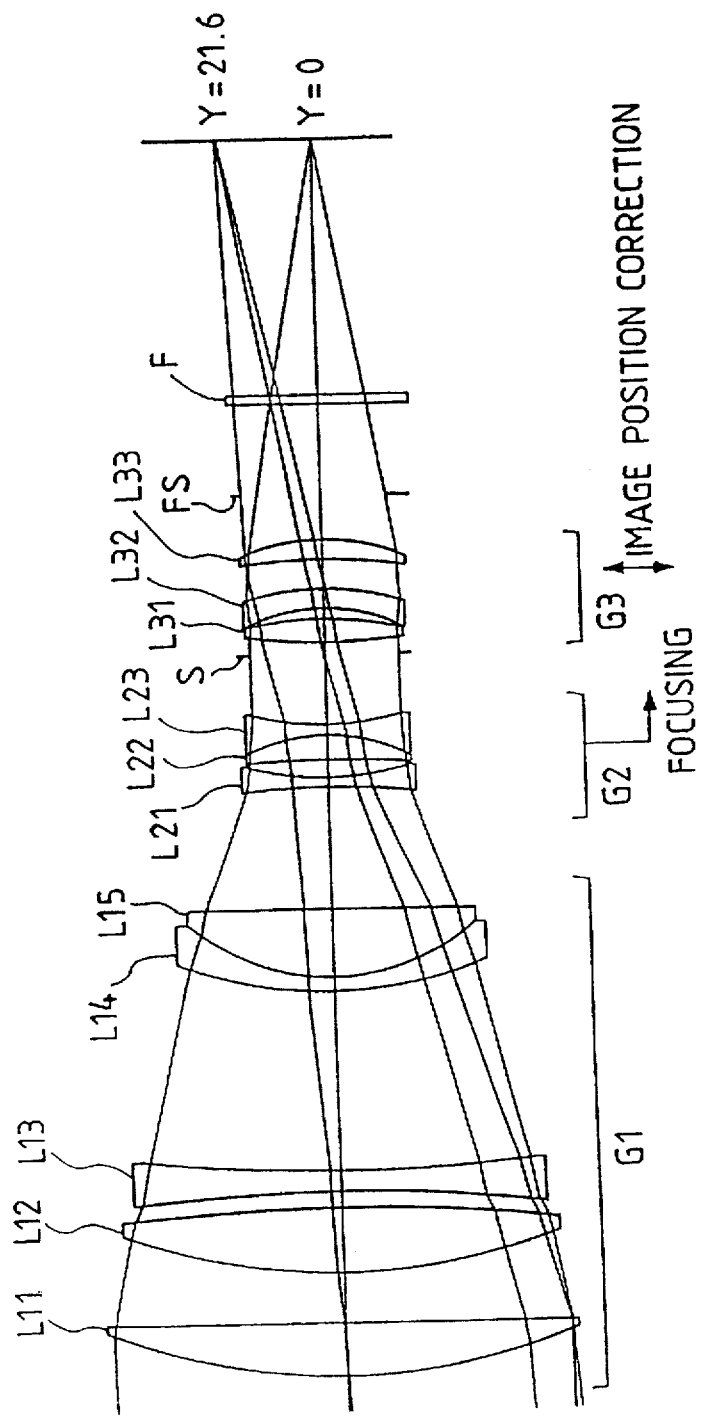
FIG. 14 is a view showing the arrangement of an image position correcting optical system according to a fifth embodiment of the present invention.
Figure 18:
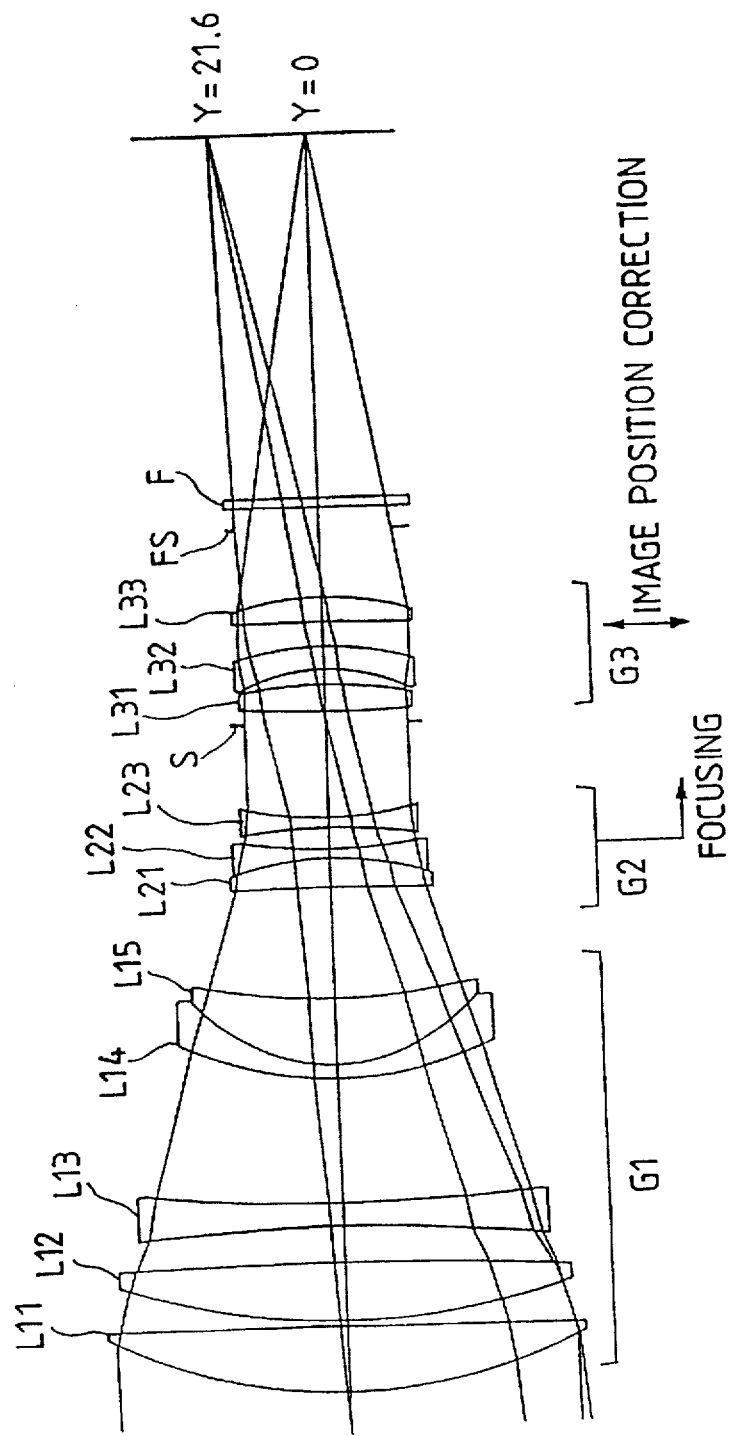
FIG. 18 is a view showing the arrangement of an image position correcting optical system according to a sixth embodiment of the present invention.

As shown in FIGS. 10, 14, and 18, an image position correcting optical system according to the fourth to sixth embodiments of the present invention comprises, in the following order from the object side, a first lens group G1 having a positive refractive power, a second lens group G2 having a negative refractive power, and a third lens group G3 having a positive refractive power. The second lens group is movable along the optical axis. The third lens group G3 comprises an image position correction group G3S which is movable in a direction substantially perpendicular to the optical axis. In each of the fourth to sixth embodiments, by moving the second lens group G2 along the optical axis, a focusing operation for an object from the infinity to the closest distance can be attained, and by moving the image position correction group G3S in the third lens group G3 in the direction substantially perpendicular to the optical axis, an object image formed on the image plane can be displaced.

A telephoto type objective lens normally adopts a so-called behind stop, i.e., an aperture stop arranged at a position, closest to the image side, in an optical system. This is to eliminate the time loss caused by a stop-down operation by decreasing the stop size, to assure sufficient stop size precision, to facilitate mechanical cooperation with a camera body, and so on. (Refer to an aperture stop of a comparative example shown in FIG. 22.)

In this manner, in a conventional image position correcting optical system, not only rays focused on the center of a frame but also rays focused on the peripheral portion of the frame are determined by the aperture stop and the diameter of a lens closest to the object side.

In this case, when the aperture stop is stopped down to a small diameter to increase the F-number, rays focused on the peripheral portion of the frame are reduced, and the effect of an increase in marginal light amount ratio is insufficient. (Refer to the marginal light amount ratio of the comparative example shown in FIG. 23.)

Therefore, when the aperture stop is used as a mechanism for assuring a desired F-number at the center of the frame, and rays on the peripheral portion of the frame are determined by, e.g., a lens member or a fixed stop, the effect of the increase in marginal light amount ratio upon stopping-down is sufficient.

In the optical arrangement of the fourth to sixth embodiments, an aperture stop is preferably inserted between the second and third lens Groups G2 and G3. When the aperture stop is inserted in this manner, the aperture stop mainly serves as a mechanism for assuring a desired F-number, and variations in astigmatism upon focusing can be reduced. In addition, asymmetricity of the astigmatism generated upon image position correction can also be eliminated. Therefore, the second lens group G2 as a lens group for attaining a focusing operation and the third lens group including the image position correction group G3S as a lens group for image position correction can be constituted by a small number of lenses.

In the fourth to sixth embodiments, the optical system satisfies conditional formula (11) below:

$$-0.2 \leq \phi 23 \leq 0.002 \tag{11}$$

where $\phi 23$: the synthesized refractive power of the second and third lens groups G2 and G3

Conditional formula (11) defines an appropriate range as to the synthesized refractive power of the second and third lens groups G2 and G3.

When $\phi 23$ is smaller than the lower limit value of conditional formula (11), the variation in spherical aberration upon focusing becomes large. Such small $\phi 23$ is not preferable.

On the contrary, when $\phi 23$ exceeds the upper limit value of conditional formula (11), the total lens length becomes too large. Such large $\phi 23$ is not preferable, either.

When the variation in spherical aberration upon focusing is to be sufficiently reduced in practice in addition to attaining a short total lens length, the lower limit value of conditional formula (11) is preferably set to be −0.05. On the other hand, when the total lens length is to be shortened in addition to a reduction in variation in spherical aberration upon focusing, the upper limit value of conditional formula (11) is preferably set to be 0.001.

Furthermore, in order to reduce the effective diameters of the second and third lens groups G2 and G3, the optical system preferably satisfies conditional formula (12) below:

$$0.2 < \phi 1 / |\phi 2| < 0.7 \tag{12}$$

where $\phi 1$: the refractive power of the first lens group G1, $\phi 2$: the refractive power of the second lens group G2.

Conditional formula (12) defines an appropriate range as to the ratio between the magnitudes of the refractive powers of the first and second lens groups G1 and G2.

When the ratio is smaller than the lower limit value of conditional formula (12), the refractive power $\phi 1$ of the first lens group G1 becomes weak. Such a small ratio is not preferable.

On the contrary, when the ratio exceeds the upper limit value of conditional formula (12), the refractive power $\phi 1$ of the first lens group G1 becomes strong, and the variation in spherical aberration upon focusing and the coma of colors become too large. Thus, such a large ratio is not preferable, either. In addition, the effective diameter of the second lens group G2 as the focusing group undesirably increases against the object of the present invention.

When the total lens length is shortened as much as possible in addition to attaining a decrease in effective diameter and aberration correction, the lower limit value of conditional formula (12) is preferably set to be 0.29. On the other hand, when the aberrations are satisfactorily corrected as much as possible and the effective diameter of the second lens group G2 is reduced as much as possible in addition to attaining a short total lens length, the upper limit value of conditional formula (12) is preferably set to be 0.41.

In order to obtain preferable dimensions (total lens length) and satisfactory optical performance (marginal light amount ratio), the optical system preferably satisfies conditional formula (13) below:

$$0.1 < \phi 3/\phi 2 < 1.0 \quad (13)$$

where $\phi 3$: the refractive power of the third lens group G3.

Conditional formula (13) defines an appropriate range as to the ratio between the magnitudes of the refractive powers of the third and second lens groups G3 and G2.

When the ratio is smaller than the lower limit value of conditional formula (13), the refractive power $\phi 2$ of the second lens group G2 becomes too strong, and the curvature of spherical aberration becomes large. Such a small ratio is not preferable. The distance from a surface closest to the image side of the third lens group G3 to the image plane becomes too large, and as a result, the total lens length becomes too large. In this respect as well, such a small ratio is not preferable.

On the contrary, when the ratio exceeds the upper limit value of conditional formula (13), the refractive power of the first lens group G1 is weakened when the focal length of the entire lens system is set to be a predetermined value, and the marginal light amount decreases. For this reason, such a large ratio is not preferable.

When the curvature of spherical aberration is to be sufficiently reduced in practice in addition to attaining an increase in marginal light amount ratio, the lower limit value of conditional formula (13) is preferably set to be 0.4. On the other hand, when the marginal light amount ratio is to be sufficiently increased in practice in addition to attaining a sufficient reduction in curvature of spherical aberration, the upper limit value of conditional formula (13) is preferably set to be 0.7.

In order to further improve the imaging performance, the first lens group G1 preferably comprises at least one positive lens and at least one negative lens, and preferably satisfies conditional formulas (14) and (15) below:

$$1.7 < na < 1.95 \quad (14)$$

$$35 < va < 50 \quad (15)$$

where na: the refractive index, for the d-line ($\lambda$=587.6 nm), of a negative lens, closest to the object side, of those in the first lens group G1, va: the Abbe's number, for the d-line ($\lambda$=587.6 nm), of the negative lens, closest to the object side, of those in the first lens group G1.

When na is smaller than the lower limit value of conditional formula (14), the surface refractive power must be strengthened to maintain a desired refractive power of the negative lens. Therefore, since the radius of curvature becomes small, and higher-order aberrations are easily generated, such small na is not preferable. In particular, such small na is not preferable since the coma of colors becomes too large.

As an existing material which has na exceeding the upper limit value of conditional formula (14), materials such as diamond, germanium, and the like are known. However, these materials are not preferable since they do not allow easy working or do not transmit visible rays.

When the lower limit value of conditional formula (14) is set to be 1.74, a better coma of colors can be obtained. When the upper limit value of conditional formula (14) is set to be 1.84, an optical system can be constituted by only relatively inexpensive optical glass materials.

When va is smaller than the lower limit value of conditional formula (15), the second-order chromatic aberration is worsened, and such small va is not preferable.

On the contrary, when va exceeds the upper limit value of conditional formula (15), the radius of curvature of the achromatic surface tends to be strong due to the first-order color correction, and as a result, the curvature of spherical aberration is generated. For this reason, such large va is not preferable.

When the lower limit value of conditional formula (15) is set to be 37, a better second-order chromatic aberration can be obtained. When the upper limit value of conditional formula (15) is set to be 45, a better spherical aberration can be obtained.

In order to further improve the imaging performance upon image position correction, the image position correction group G3S preferably comprises at least two positive lenses, and each positive lens in the image position correction group G3S preferably satisfies conditional formulas (16) and (17) below:

$$1.40 < nb < 1.75 \quad (16)$$

$$50 < vb < 98 \quad (17)$$

where nb: the refractive index, for the d-line ($\lambda$=587.6 nm), of each positive lens in the image position correction group G3S, vb: the Abbe's number, for the d-line ($\lambda$=587.6 nm), of each positive lens in the image position correction group G3S When nb is smaller than the lower limit value of conditional formula (16), the radius of curvature decreases to strengthen the surface refractive power, and as a result, the spherical aberration of the image position correction group becomes large. Such large spherical aberration causes a flare on the entire frame upon image position correction. For this reason, such small nb is not preferable.

On the contrary, when nb exceeds the upper limit value of conditional formula (16), only an optical glass material which is disadvantageous in terms of the second-order chromatic aberration can be selected at the present. For this reason, such large nb is not preferable.

When the lower limit value of conditional formula (16) is set to be 1.45, better imaging performance can be obtained upon image position correction. In other words, the image position correction range can be widened. When the upper limit value of conditional formula (16) is set to be 1.63, a better second-order chromatic aberration can be obtained.

When vb is smaller than the lower limit value of conditional formula (17), only an optical glass material which is disadvantageous in terms of the second-order chromatic aberration can be selected at the present. For this reason, such small vb is not preferable.

On the contrary, when vb exceeds the upper limit value of conditional formula (17), there is no selectable optical glass material under the premise that the optical system is used under visible rays. For this reason, such large vb is not preferable.

When the lower limit value of conditional formula (17) is set to be 62, a better second-order chromatic aberration can be obtained.

Furthermore, when the upper limit value of conditional formula (16) is set to be 1.55 and the lower limit value of conditional formula (17) is set to be 64, better imaging characteristics can be obtained upon image position correction.

When the upper limit value of conditional formula (17) is set to be 84, cost reduction can be attained while maintaining a good second-order chromatic aberration, without using any expensive optical glass material such as fluorine.

The image position correction group G3S is preferably utilized not only for correcting a mechanical vibration such as any variation of an image position upon focusing but also for correcting any variation of an image position caused by a camera shake (i.e., caused by a vibration of the optical system), since the optical system can be easily handled while maintaining high imaging performance.

In this case, since the image position correcting optical system can be rendered compact with the above-mentioned arrangement, a hand-held photographing operation can be performed if a vibration reduction mechanism is added.

Furthermore, at least one fixed stop is preferably arranged on the image side of the third lens group G3.

If the image position correction group G3S is a fixed group, marginal rays can be determined by the effective lens diameter in the fixed group. However, in practice, since the image position correction group G3S is a movable group which is movable in a direction substantially perpendicular to the optical axis, the effective diameter must be increased in correspondence with the moving amount for image position correction as compared to the effective diameter of the fixed group. Therefore, marginal rays are preferably determined by a group other than the image position correction group G3S. On the object side of the image position correction group G3S, since one bundle of rays is determined by the effective diameter of a lens, closest to the object side, in the optical system, the other bundle of rays is preferably determined by an optical member on the image side of the image position correction group G3S.

The arrangements of the fourth to sixth embodiments and a comparative example will be explained hereinafter.

In FIGS. 10, 14, and 18, a detector for detecting a vibration, in the rotational direction, of the image position correcting optical system, and a driving mechanism for moving the image position correction group in a direction substantially perpendicular to the optical axis are not shown.

In the fourth to sixth embodiments, an aperture stop S is arranged between the second and third lens groups G2 and G3, and a fixed stop FS is arranged on the image side of the third lens group G3. In addition, a detachable filter F is arranged on the image side of the fixed stop FS.

In the fourth to sixth embodiments, the image position correction group G3S is constituted by the entire third lens group.

Figure 22:
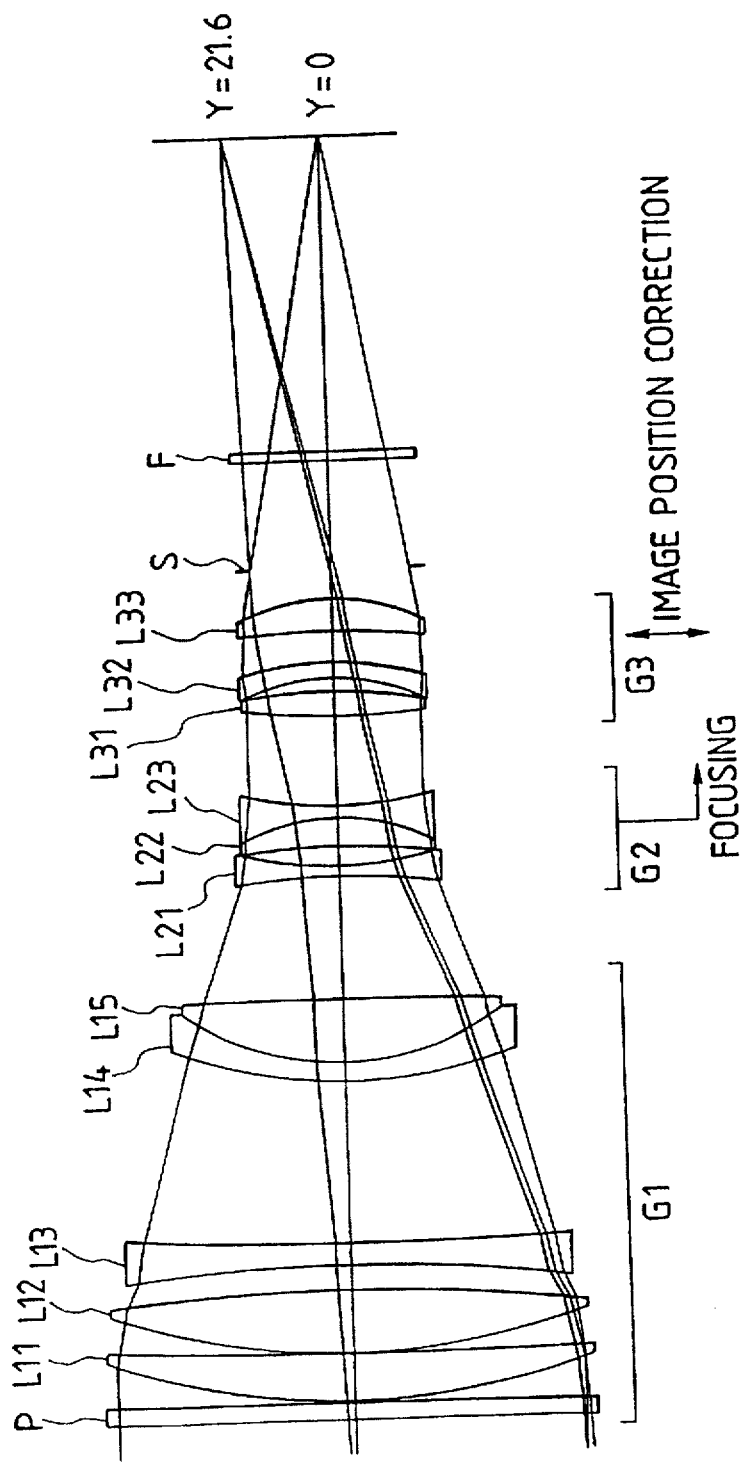
FIG. 22 is a view showing the arrangement of a comparative example of an image position correcting optical system as compared to the first embodiment.

However, although the comparative example shown in FIG. 22 has the same lens arrangement (glass positions) as that in the fourth embodiment, the aperture stop S is arranged at the position of the fixed stop in the fourth embodiment. Therefore, in the comparative example, no fixed stop FS is arranged.

Note that the respective embodiments have a common focal length f in an infinity state, F-number $F_{NO}$ in the infinity state, and photographing distance R as follows.

f=294 mm
$F_{NO}$=2.9
R=∞ to 2.5 m

In the respective embodiments, the image position, correction displacement amount of the image position correction group G3S (i.e., the third lens group G3) is ±1 mm, and the corresponding moving amount on the image plane is also ±1 mm. Thus, a vibration in the rotational direction in a field angle ω=±0.2° is corrected.

[Fourth Embodiment]

FIG. 10 is a view showing the arrangement of an image position correcting optical system according to the fourth embodiment of the present invention. The image position correcting optical system shown in FIG. 10 comprises, in the following order from the object side: a first lens group G1 consisting of a plane-parallel glass member P, a positive meniscus lens L11 with a convex surface facing the object side, a biconvex lens L12, a biconcave lens L13, and a cemented lens (L14, L15) of a negative meniscus lens L14 with a convex surface facing the object side and a biconvex lens L15 with a small radius of curvature on the object side; a second lens group G2 consisting of a biconcave lens L21, and a cemented lens (L22, L23) of a positive meniscus lens L22 with a concave surface facing the object side and a biconcave lens L23; a third lens group G3 consisting of an aperture stop S, a biconvex lens L31, a negative meniscus lens L32 with a concave surface facing the object side, and a positive meniscus lens L33 with a concave surface facing the object side; a fixed stop FS; and a filter F.

Note that the lens system of the fourth embodiment is effective not only as an optical system for correcting an image position but also as an objective lens system which has an improved marginal light amount ratio and is made compact. More specifically, the objective lens system comprises, in the following order from the object side, a first positive lens unit and a second positive lens unit.

In the fourth embodiment, the first positive lens unit comprises, in the following order from the object side, the plane-parallel glass member P, the positive meniscus lens L11 with the convex surface facing the object side, the biconvex lens L12, and the biconcave lens L13. The second positive lens unit comprises, in the following order from the object side, a first subunit having a positive refractive power, a second subunit having a negative refractive power, the aperture stop S, and a third subunit which has a positive refractive power and is movable in a direction perpendicular to the optical axis. The first subunit of the second positive lens unit comprises the cemented lens (L14, L15), of the negative meniscus lens L14 with the convex surface facing the object side, and the biconvex lens L15 with a small radius of curvature on the object side. The second subunit of the second positive lens unit comprises the biconcave lens L21, and the cemented lens (L22, L23) of the positive meniscus lens L22 with the concave surface facing the object side and the biconcave lens L23. The third subunit of the second positive lens unit comprises the biconvex lens L31, the negative meniscus lens L32 with the concave surface facing the object side, and the positive meniscus lens L33 with the concave surface facing the object side. On the image side of the third subunit of the second positive lens unit, the fixed stop FS and the filter F are arranged.

FIG. 10 shows the positions of the respective lens groups in an infinity state, and a focusing operation for a close-distance object is attained by moving the second lens group G2 toward the image side. The third lens group G3 is appropriately moved by a driving actuator (not shown) as a displacement means, thereby correcting any fluctuation of an image position caused by a vibration of the optical system.

Table 4 below summarizes the data values of the fourth embodiment of the present invention. In Table 4, numerals in the leftmost column represent the order of lens surfaces from the object side, r is the radius of curvature of each lens surface, d is the lens surface interval, and n and ν are respectively the refractive index and Abbe's number for the d-line (λ=587.6 nm).

TABLE 4

| | r | d | ν | n |
|---|---|---|---|---|
| 1 | ∞ | 4.000 | 64.10 | 1.51680 |
| 2 | ∞ | 0.600 | | |
| 3 | 148.7750 | 11.000 | 82.52 | 1.49782 |
| 4 | 1291.7928 | 0.300 | | |
| 5 | 142.0522 | 15.000 | 82.52 | 1.49782 |
| 6 | −376.6713 | 6.000 | | |
| 7 | −318.9710 | 5.000 | 40.90 | 1.79631 |
| 8 | 755.2599 | 38.000 | | |
| 9 | 100.0747 | 3.500 | 49.45 | 1.77279 |
| 10 | 53.6250 | 16.000 | 82.52 | 1.49782 |
| 11 | −1263.6268 | (d11 = variable) | | |
| 12 | −175.4746 | 2.700 | 61.09 | 1.58913 |
| 13 | 80.9192 | 4.200 | | |
| 14 | −173.2531 | 7.000 | 37.90 | 1.72342 |
| 15 | −42.2000 | 2.800 | 64.10 | 1.51680 |
| 16 | 73.7941 | (d16 = variable) | | |
| 17 | ∞ | 2.000 | (aperture stop S) | |
| 18 | 191.0046 | 5.800 | 69.98 | 1.51860 |
| 19 | −86.5325 | 3.100 | | |
| 20 | −42.7962 | 4.000 | 33.89 | 1.80384 |
| 21 | −63.3964 | 7.100 | | |
| 22 | −163.9633 | 6.700 | 65.77 | 1.46450 |
| 23 | −51.3067 | 6.500 | | |
| 24 | ∞ | 25.700 | (fixed stop FS) | |
| 25 | ∞ | 2.000 | 64.10 | 1.51680 |
| 26 | ∞ | 72.995 | | |

(Variable Interval Upon Focusing)

| | Infinity | Closest Distance (2.5 m) |
|---|---|---|
| d11 | 28.0386 | 39.0200 |
| d16 | 19.6015 | 8.6201 |

(Condition Corresponding Values)

φ1 = 0.0066
φ2 = −0.0175
φ3 = 0.0090
(11) φ23 = −0.0012
(12) φ1/|φ2| = 0.38
(13) φ3/|φ2| = 0.51
(14) na = 1.79631
(15) νa = 40.90
(16) nb = 1.51860 1.46450
(17) νb = 69.98 65.77

(Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

Figure 11:
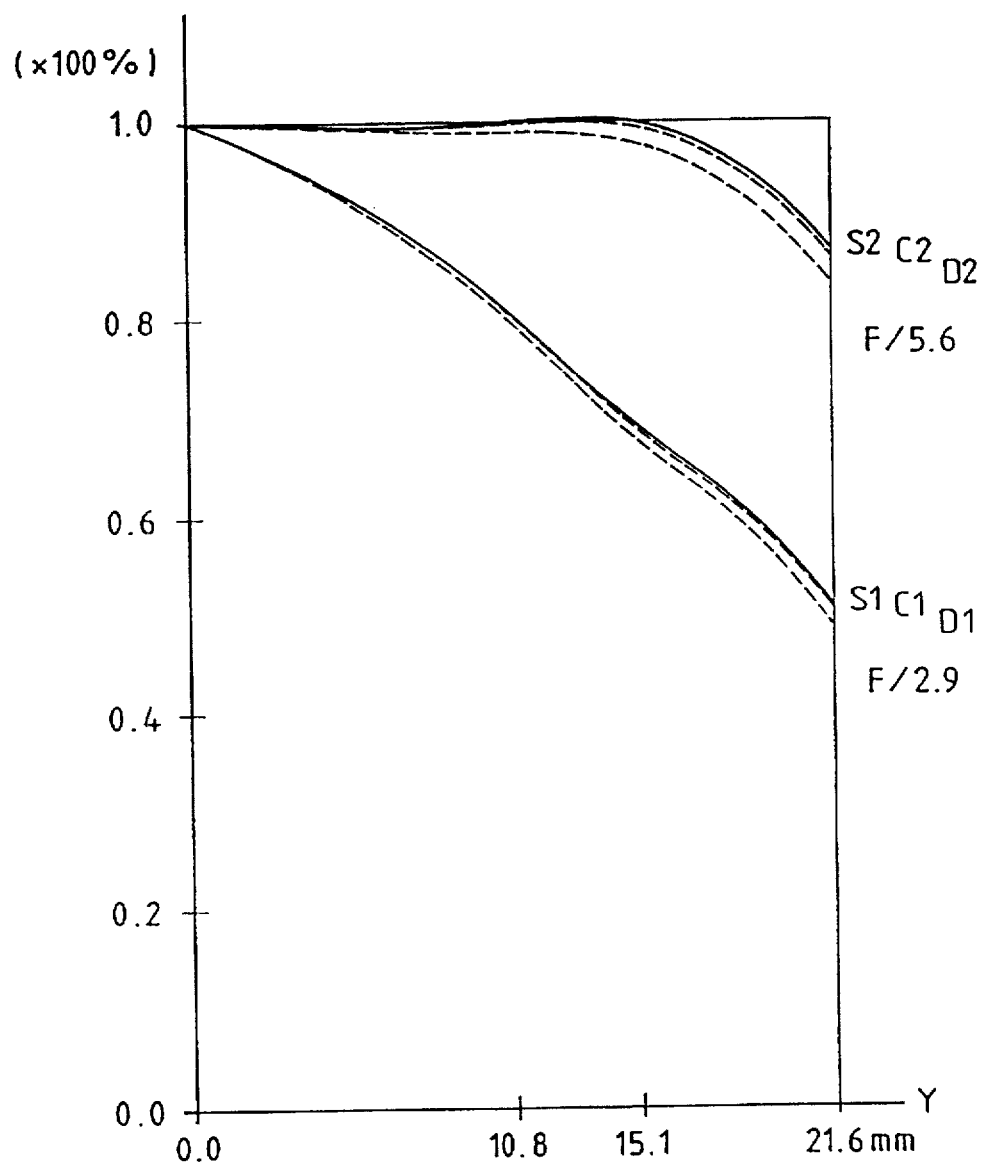
FIG. 11 is a graph showing optical characteristics of the fourth embodiment.

FIG. 11 is a graph showing the light amount ratio of the fourth embodiment.

In FIG. 11, the ordinate represents an aperture efficiency (or vignetting factor) S, a field illumination ratio C, and a field illumination ratio (taking account of distortion) D in percentage, and the abscissa represents an image height Y.

Note that curves S1, C1, and D1 represent the aperture efficiency, the field illumination ratio, and the field illumination ratio (taking account of distortion) obtained when the F-number is 2.9, and the diameter of the aperture stop corresponds to an effective diameter of 38.50.

On the other hand, curves S2, C2, and D2 represent the aperture efficiency, the field illumination ratio, and the field illumination ratio (taking account of distortion) obtained when the diameter of the aperture stop S is stopped down to 19.62 to obtain an F-number of 5.6.

As can be seen from FIG. 11, in this embodiment, the increase in marginal light amount upon stopping-down of the aperture stop S is large.

FIGS. 12A to 12F and FIGS. 13A to 13F are graphs showing various aberrations in the infinity focusing state and the closest-distance (2.5 m) focusing state in the fourth embodiment. In these graphs, $F_{NO}$ is the F-number, Y is the image height, D is the d-line (λ=587.6 nm), C is the C-line (λ=656.3 nm), F is the F-line (λ=486.1 nm), and G is the g-line (λ=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

[Fifth Embodiment]

FIG. 14 is a view showing the arrangement of an image position correcting optical system according to the fifth embodiment of the present invention. The image position correcting optical system shown in FIG. 14 comprises, in the following order from the object side: a first lens group G1 consisting of a positive meniscus lens L11 with a convex surface facing the object side, a biconvex lens L12, a biconcave lens L13, and a cemented lens (L14, L15) of a negative meniscus lens L14 with a convex surface facing the object side and a plano-convex lens L15 with a convex surface facing the object side; a second lens group G2 consisting of a biconcave lens L21, and a cemented lens (L22, L23) of a positive meniscus lens L22 with a concave surface facing the object side and a biconcave lens L23; a third lens group G3 consisting of an aperture stop S, a biconvex lens L31, a negative meniscus lens L32 with a concave surface facing the object side, and a positive meniscus lens L33 with a concave surface facing the object side; a fixed stop FS; and a filter F.

Figure 24:
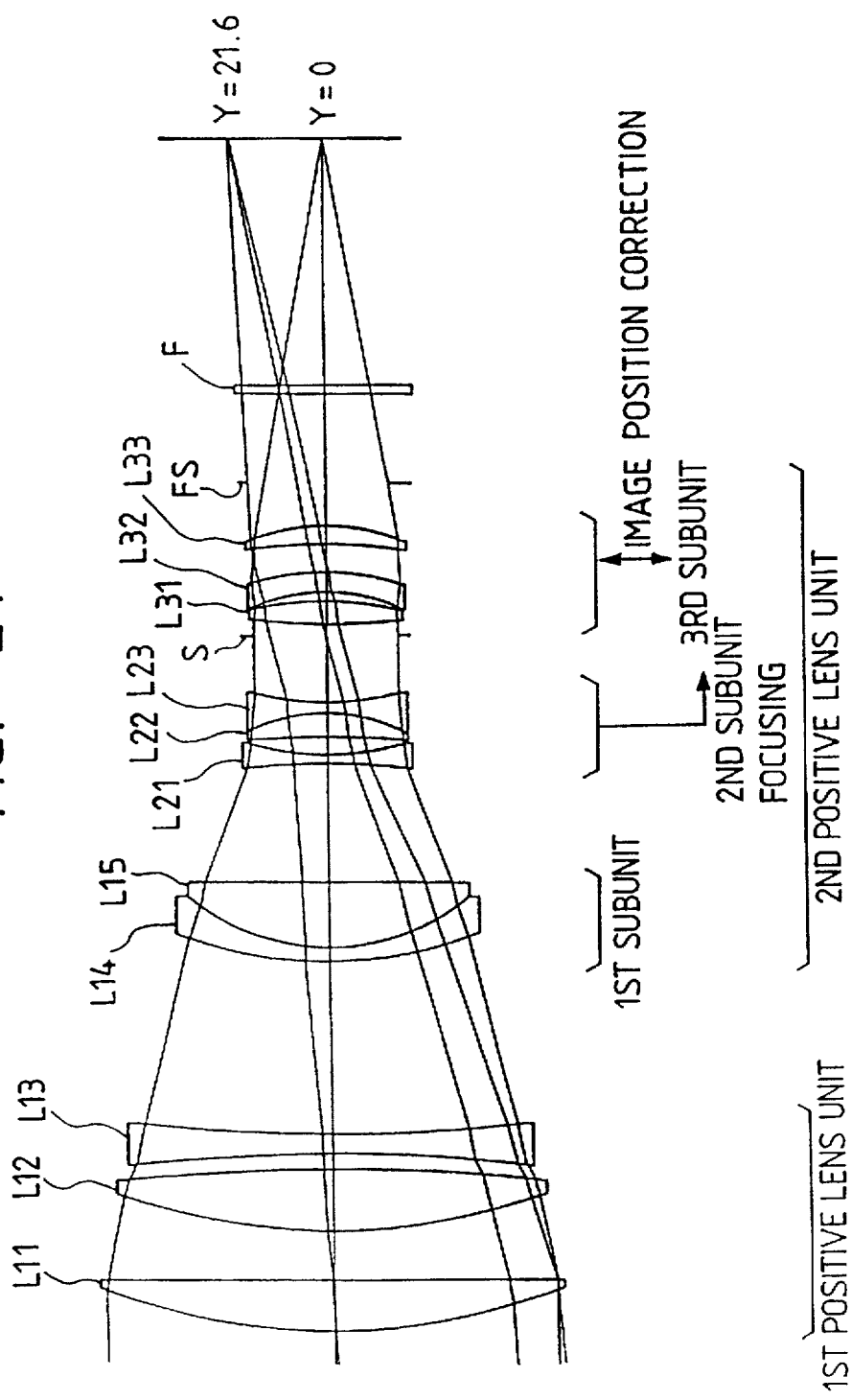
FIG. 24 is a view showing the arrangement of the optical system of the fifth embodiment but with a different grouping of the lens units.

Note that the lens system of the fifth embodiment is effective not only as an optical system for correcting an image position but also as an objective lens system which has an improved marginal light amount ratio and is made compact, as in the fourth embodiment. In the fifth embodiment, as shown in FIG. 24, a first positive lens unit comprises the positive meniscus lens L11, the biconvex lens L12, and the biconcave lens L13. A first subunit, having a positive refractive power, of a second positive lens unit comprises the cemented lens (L14, L15). A second subunit, having a negative refractive power, of the second positive lens unit comprises the biconcave lens L21 and the cemented lens (L22, L23). A third subunit, having a positive refractive power, of the second positive lens unit comprises the biconvex lens L31, the negative meniscus lens L32, and the positive meniscus lens L33.

FIG. 14 shows the positions of the respective lens groups in an infinity state, and a focusing operation for a close-distance object is attained by moving the second lens group G2 toward the image side. The third lens group G3 is appropriately moved by a driving actuator (not shown) as a displacement means, thereby correcting any fluctuation of an image position caused by a vibration of the optical system.

Table 5 below summarizes the data values of the fifth embodiment of the present invention. In Table 5, numerals in the leftmost column represent the order of lens surfaces from the object side, r is the radius of curvature of each lens surface, d is the lens surface interval, and n and ν are respectively the refractive index and Abbe's number for the d-line (λ=587.6 nm).

TABLE 5

|   | r | d | ν | n |
|---|---|---|---|---|
| 1 | 142.3033 | 11.700 | 82.52 | 1.49782 |
| 2 | 5350.3380 | 12.100 | | |
| 3 | 129.2723 | 15.300 | 82.52 | 1.49782 |
| 4 | −410.7494 | 3.700 | | |
| 5 | −374.8045 | 4.900 | 40.90 | 1.79631 |
| 6 | 353.0736 | 41.500 | | |
| 7 | 86.9509 | 3.500 | 52.30 | 1.74810 |
| 8 | 47.1249 | 16.000 | 82.52 | 1.49782 |
| 9 | ∞ | (d9 = variable) | | |
| 10 | −159.2694 | 2.300 | 54.01 | 1.61720 |
| 11 | 68.3596 | 3.700 | | |
| 12 | −276.2141 | 6.300 | 33.89 | 1.80384 |
| 13 | −36.7988 | 2.300 | 54.01 | 1.61720 |
| 14 | 69.2766 | (d14 = variable) | | |
| 15 | ∞ | 3.000 | (aperture stop S) | |
| 16 | 148.0355 | 5.300 | 69.98 | 1.51860 |
| 17 | −72.7192 | 2.500 | | |
| 18 | −38.0917 | 4.700 | 33.89 | 1.80384 |
| 19 | −57.1878 | 6.600 | | |
| 20 | −129.2660 | 4.500 | 65.77 | 1.46450 |
| 21 | −45.3823 | 9.800 | | |
| 22 | ∞ | 20.700 | (fixed stop FS) | |
| 23 | ∞ | 2.000 | 64.10 | 1.51680 |
| 24 | ∞ | 59.512 | | |

(Variable Interval Upon Focusing)

|  | Infinity | Closest Distance (2.5 m) |
|---|---|---|
| d9 | 28.6968 | 39.5778 |
| d14 | 15.9300 | 5.0268 |

(Condition Corresponding Values)

$\phi 1 = 0.0066$
$\phi 2 = -0.0204$
$\phi 3 = 0.0105$
(11) $\phi 23 = -0.0014$
(12) $\phi 1/|\phi 2| = 0.32$
(13) $\phi 3/|\phi 2| = 0.51$
(14) na = 1.79631
(15) νa = 40.90
(16) nb = 1.51860  1.46450
(17) νb = 69.98  65.77

(Image position Correction Data)

|  | Infinity Focusing State | Closest-distance Focusing State |
|---|---|---|
| Image Position Correction Displacement | 1.0 mm (maximum) | 1.0 mm (maximum) |

TABLE 5-continued

| Amount Corresponding Image Moving Amount | +1.0 mm (maximum) | +1.0 mm (maximum) |
|---|---|---|

Note that the positive sign of the image moving amount indicates that the image moves in the same direction as the displacement direction of the image position correction lens group.

Figure 15:
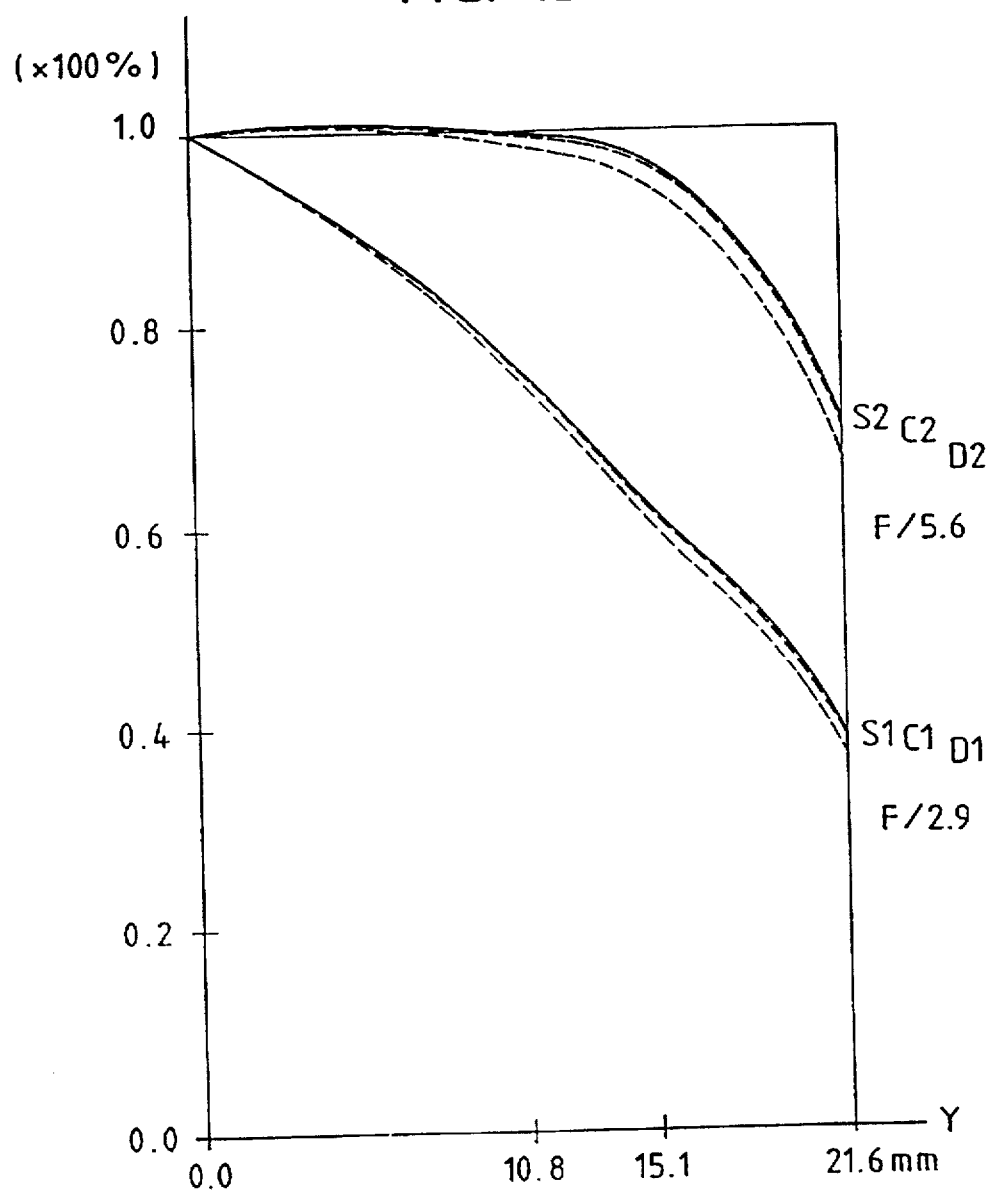
FIG. 15 is a graph showing optical characteristics of the fifth embodiment.

FIG. 15 is a graph showing the light amount ratio of the fifth embodiment.

In FIG. 15, the ordinate represents an aperture efficiency (or vignetting factor) S, a field illumination ratio C, and a field illumination ratio (taking account of distortion) D in percentage, and the abscissa represents an image height Y.

Note that curves S1, C1, and D1 represent the aperture efficiency, the field illumination ratio, and the field illumination ratio (taking account of distortion) obtained when the F-number is 2.9, and the diameter of the aperture stop corresponds to an effective diameter of 33.14.

On the other hand, curves S2, C2, and D2 represent the aperture efficiency, the field illumination ratio, and the field illumination ratio (taking account of distortion) obtained when the diameter of the aperture stop S is stopped down to 16.88 to obtain an F-number of 5.6.

As can be seen from FIG. 15, in this embodiment, the increase in marginal light amount upon stopping-down of the aperture stop S is large.

FIGS. 16A to 16F and FIGS. 17A to 17F are graphs showing various aberrations in the infinity focusing state and the closest-distance (2.5 m) focusing state in the fifth embodiment. In these graphs, $F_{NO}$ is the F-number, Y is the image height, D is the d-line (λ=587.6 nm), C is the C-line (λ=656.3 nm), F is the F-line (λ=486.1 nm), and G is the g-line (λ=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

[Sixth Embodiment]

FIG. 18 is a view showing the arrangement of an image position correcting optical system according to the sixth embodiment of the present invention. The image position correcting optical system shown in FIG. 18 comprises, in the following order from the object side: a first lens group G1 consisting of a biconvex lens L11 with a surface which has a more intense curvature (a smaller radius of curvature) facing the object side, a biconvex lens L12, a biconcave lens L13, and a cemented lens (L14, L15) of a negative meniscus lens L14 with a convex surface facing the object side and a positive meniscus lens L15 with a convex surface facing the object side; a second lens group G2 consisting of a cemented lens of a positive meniscus lens L21 with a concave surface facing the object side and a biconcave lens L22, and a biconcave lens L23; a third lens group G3 consisting of an aperture stop S, a biconvex lens L31, a negative meniscus lens L32 with a concave surface facing the object side, and a positive meniscus lens L33 with a concave surface facing the object side; a fixed stop FS; and a filter F.

Note that the lens system of the sixth embodiment is effective not only as an optical system for correcting an image position but also as an objective lens system which has an improved marginal light amount ratio and is made compact, as in the fourth embodiment. In the sixth embodiment, a first positive lens unit comprises the biconvex lens L11, the biconvex lens L12, and the biconcave lens L13. A first subunit, having a positive refractive power, of a second positive lens unit comprises the cemented lens (L14, L15). A second subunit, having a negative refractive power, of the second positive lens unit comprises the cemented lens (L21, L22) and the biconcave lens L23. A third subunit, having a positive refractive power, of the second positive lens unit comprises the biconvex lens L31, the negative meniscus lens L32, and the positive meniscus lens L33.

FIG. 18 shows the positions of the respective lens groups in an infinity state, and a focusing operation for a close-distance object is attained by moving the second lens group G2 toward the image side. The third lens group G3 is appropriately moved by a driving actuator (not shown) as a displacement means, thereby correcting any fluctuation of an image position caused by a vibration of the optical system.

Table 6 below summarizes the data values of the sixth embodiment of the present invention. In Table 6, numerals in the leftmost column represent the order of lens surfaces from the object side, r is the radius of curvature of each lens surface, d is the lens surface interval, and n and v are respectively the refractive index and Abbe's number for the d-line ($\lambda$=587.6 nm).

TABLE 6

| | r | d | v | n |
|---|---|---|---|---|
| 1 | 113.0615 | 15.000 | 82.52 | 1.49782 |
| 2 | −4171.0168 | 1.140 | | |
| 3 | 143.5217 | 14.000 | 94.98 | 1.43500 |
| 4 | −1026.4512 | 8.566 | | |
| 5 | −470.7706 | 5.899 | 35.19 | 1.74950 |
| 6 | 385.2294 | 29.084 | | |
| 7 | 85.5340 | 2.761 | 58.50 | 1.65160 |
| 8 | 40.4354 | 15.000 | 82.52 | 1.49782 |
| 9 | 139.9153 | (d9 = variable) | | |
| 10 | −551.4153 | 7.000 | 37.90 | 1.72342 |
| 11 | −62.9412 | 2.243 | 69.98 | 1.51860 |
| 12 | 111.4623 | 5.000 | | |
| 13 | −110.3623 | 2.243 | 59.60 | 1.53996 |
| 14 | 71.9391 | (d14 = variable) | | |
| 15 | ∞ | 3.000 | (aperture stop S) | |
| 16 | 407.5412 | 6.200 | 82.52 | 1.49782 |
| 17 | −89.3797 | 3.500 | | |
| 18 | −39.8769 | 5.800 | 46.54 | 1.80411 |
| 19 | −56.4673 | 5.042 | | |
| 20 | −766.2726 | 6.000 | 82.52 | 1.49782 |
| 21 | −58.0553 | 15.200 | | |
| 22 | ∞ | 4.900 | (fixed stop FS) | |
| 23 | ∞ | 2.000 | 64.10 | 1.51680 |
| 24 | ∞ | 83.631 | | |

(Variable Interval Upon Focusing)

| | Infinity | Closest Distance (2.5 m) |
|---|---|---|
| d9 | 25.9474 | 42.4151 |
| d14 | 22.0800 | 5.6123 |

(Condition Corresponding Values)

$\phi$1 = 0.0055
$\phi$2 = −0.0154
$\phi$3 = 0.0095

TABLE 6-continued

(11) $\phi$23 = 0.0010
(12) $\phi$1/$\phi$2I = 0.36
(13) $\phi$3/$\phi$2I = 0.62
(14) na = 1.74950
(15) va = 35.19
(16) nb = 1.49782 1.49782
(17) vb = 82.52 82.52

(Image position Correction Data)

| | Infinity Focusing State | Closest-distance Focusing State |
|---|---|---|
| Image Position Correction Displacement Amount | 1.0 mm (maximum) | 1.0 mm (maximum) |
| Corresponding Image Moving Amount | +1.0 mm (maximum) | +1.0 mm (maximum) |

Note that the positive sign of the image moving amount indicates that the image moves in the same direction as the displacement direction of the image position correction lens group.

Figure 19:
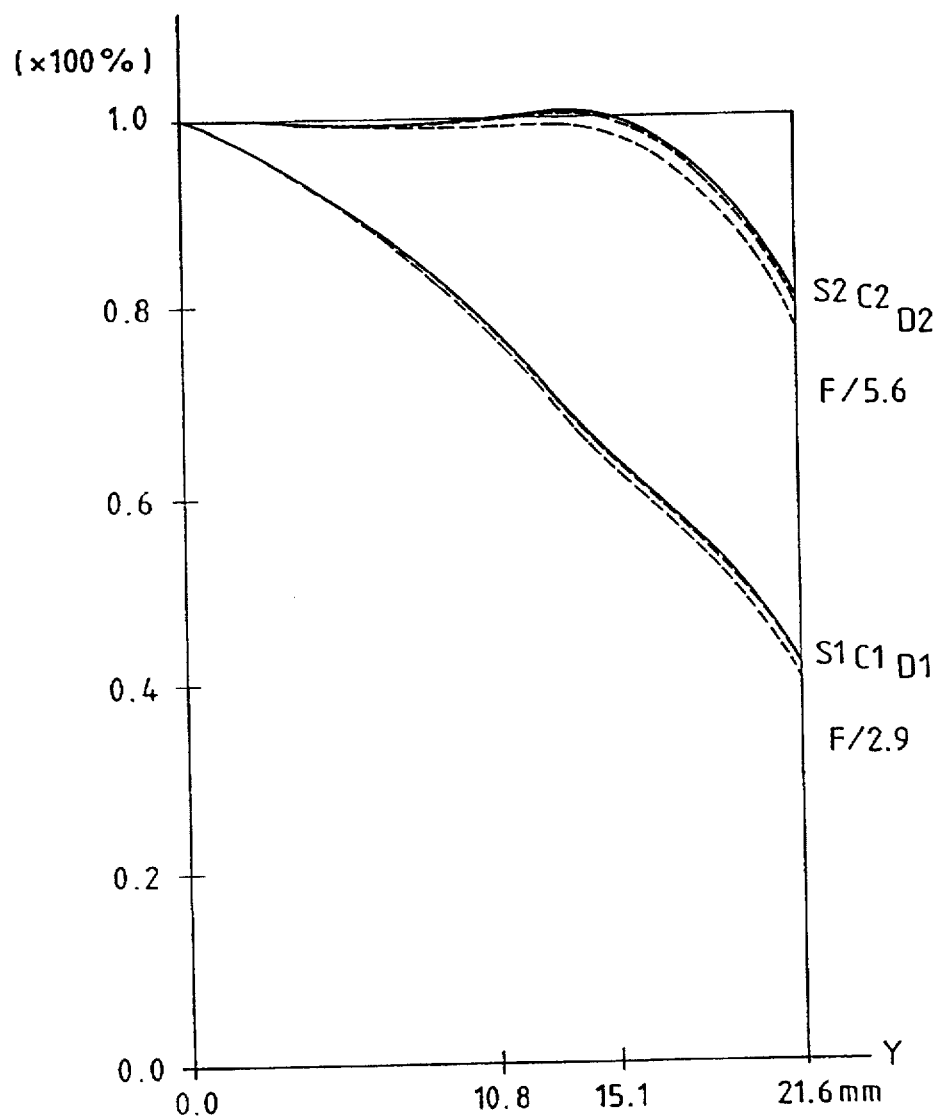
FIG. 19 is a graph showing optical characteristics of the sixth embodiment.
Figures 21A, 21B, 21C:
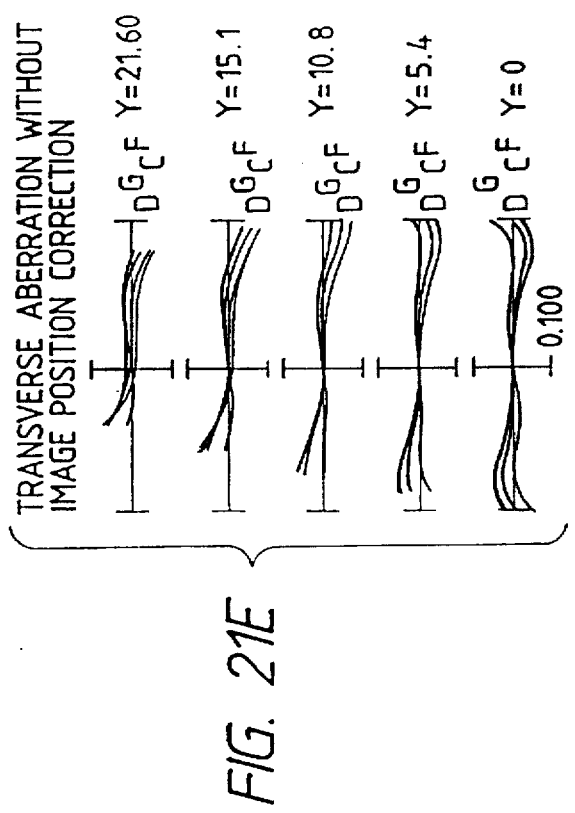
FIGS. 21A to 21F are graphs showing various aberrations in a closest-distance focusing state in the sixth embodiment.
Figure 21D:
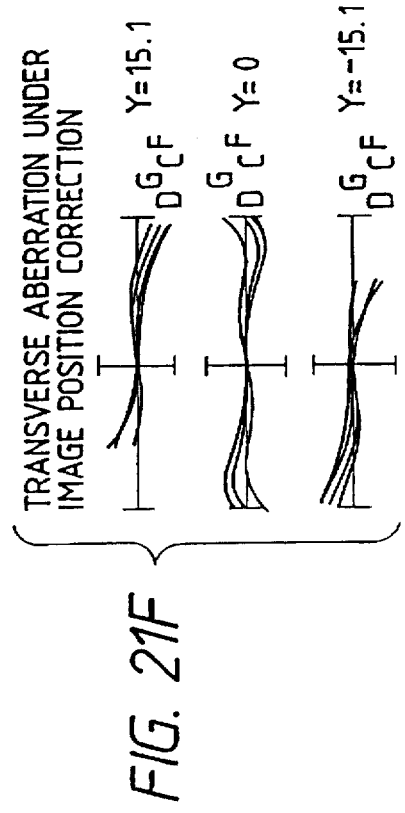
Figure 21E:
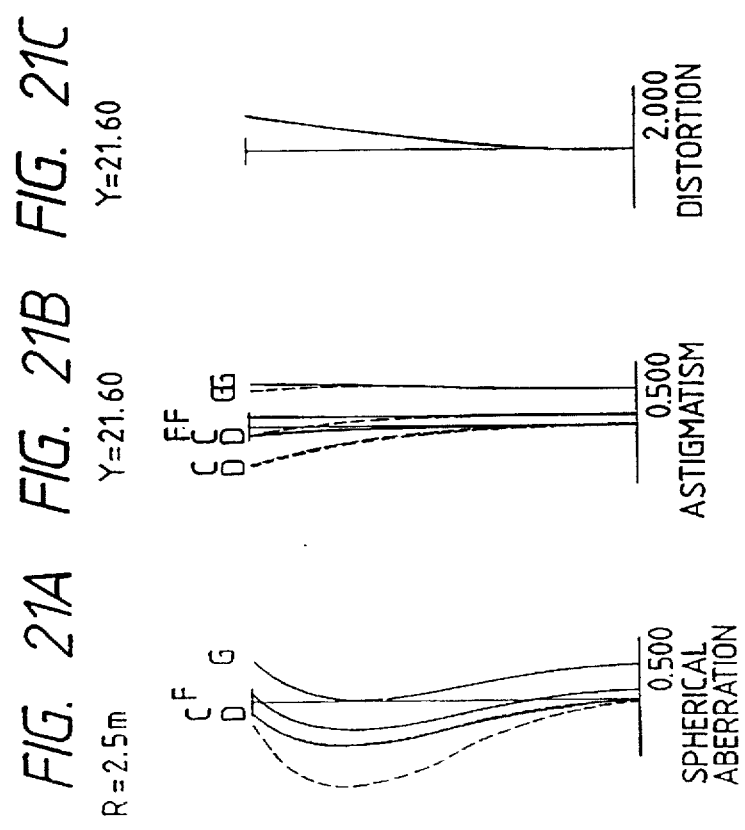
Figure 21F:

FIG. 19 is a graph showing the light amount ratio of the sixth embodiment.

In FIG. 19, the ordinate represents an aperture efficiency (or vignetting factor) S, a field illumination ratio C, and a field illumination ratio (taking account of distortion) D in percentage, and the abscissa represents an image height Y.

Note that curves S1, C1, and D1 represent the aperture efficiency, the field illumination ratio, and the field illumination ratio (taking account of distortion) obtained when the F-number is 2.9, and the diameter of the aperture stop corresponds to an effective diameter of 36.24.

On the other hand, curves S2, C2, and D2 represent the aperture efficiency, the field illumination ratio, and the field illumination ratio (taking account of distortion) obtained when the diameter of the aperture stop S is stopped down to 18.59 to obtain an F-number of 5.6.

As can be seen from FIG. 19, in this embodiment, the increase in marginal light amount upon stopping-down of the aperture stop S is large.

FIGS. 20A to 20F and FIGS. 21A to 21F are graphs showing various aberrations in the infinity focusing state and the closest-distance (2.5 m) focusing state in the sixth embodiment. In these graphs, $F_{NO}$ is the F-number, Y is the image height, D is the d-line ($\lambda$=587.6 nm), C is the C-line ($\lambda$=656.3 nm), F is the F-line ($\lambda$=486.1 nm), and G is the g-line ($\lambda$=435.6 nm).

In each graph showing astigmatism, a solid curve represents the sagittal image plane, and a broken curve represents the meridional image plane. Also, in each graph showing spherical aberration, a broken curve represents the sine condition, and each graph showing chromatic aberration of magnification is presented with reference to the d-line.

Furthermore, each graph showing transverse aberration under image position correction corresponds to one obtained when the image position correction displacement amount is maximum, i.e., 1 mm.

As can be seen from these graphs, in this embodiment, various aberrations are satisfactorily corrected in addition to those under image position correction.

[Comparative Example]

FIG. 22 is a view showing the arrangement of a comparative example of an image position correcting optical system corresponding to the fourth embodiment.

The image position correcting optical system shown in FIG. 22 comprises, in the following order from the object side: a first lens group G1 consisting of a plane-parallel glass member P, a positive meniscus lens L11 with a convex surface facing the object side, a biconvex lens L12, a biconcave lens L13, and a cemented lens (L14, L15) of a negative meniscus lens L14 with a convex surface facing the object side and a biconvex lens L15 with a small radius of curvature on the object side; a second lens group G2 consisting of a biconcave lens L21, and a cemented lens (L22, L23) of a positive meniscus lens L22 with a concave surface facing the object side and a biconcave lens L23; a third lens group G3 consisting of a biconvex lens L31, a negative meniscus lens L32 with a concave surface facing the object side, and a positive meniscus lens L33 with a concave surface facing the object side; an aperture stop S; and a filter F.

As described above, the image position correcting optical system of the comparative example has substantially the same arrangement as that of the image position correcting optical system of the fourth embodiment, except that the aperture stop is arranged at the position of the fixed stop in the fourth embodiment. In other words, the image position correcting optical system of the comparative example adopts a so-called behind stop, i.e., an aperture stop arranged on the image side of the third lens group, while the image position correcting optical system of the fourth embodiment of the present invention comprises the aperture stop inserted between the second and third lens groups G2 and G3.

The comparative example is an example for comparing the marginal light amount ratio upon stopping-down with that of the fourth embodiment. Therefore, a description of the data values of the comparative example will be omitted.

Figure 23:
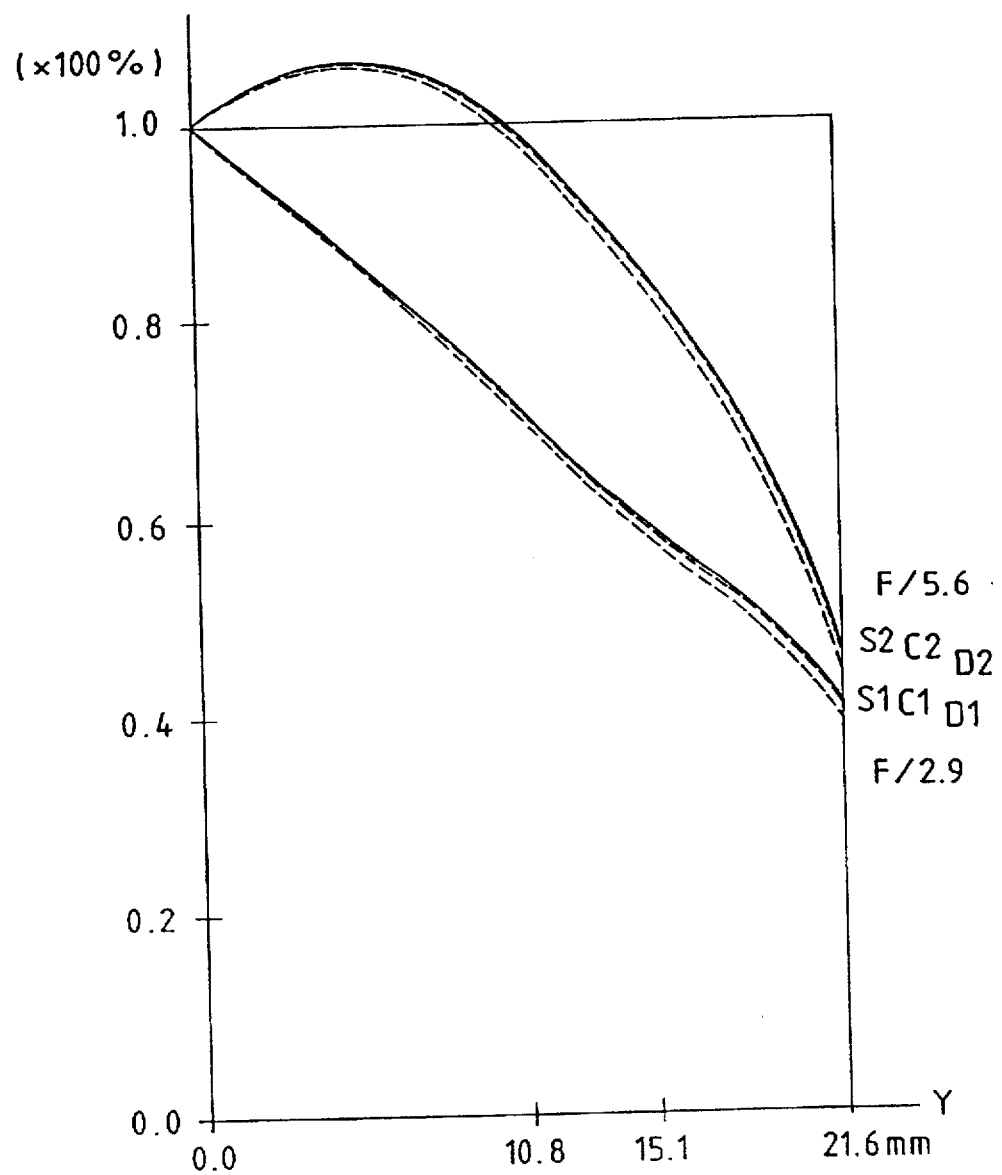
FIG. 23 is a graph showing optical characteristics of the comparative example.

FIG. 23 is a graph showing the light amount ratio of the comparative example.

In FIG. 23, the ordinate represents an aperture efficiency (or vignetting factor) S, a field illumination ratio C, and a field illumination ratio (taking account of distortion) D in percentage, and the abscissa represents an image height Y.

Note that curves S1, C1, and D1 represent the aperture efficiency, the field illumination ratio, and the field illumination ratio (taking account of distortion) obtained when the F-number is 2.9, and the diameter of the aperture stop corresponds to an effective diameter of 38.50.

On the other hand, curves S2, C2, and D2 represent the aperture efficiency, the field illumination ratio, and the field illumination ratio (taking account of distortion) obtained when the diameter of the aperture stop S is stopped down to 19.62 to obtain an F-number of 5.6.

As can be seen from a comparison between the light amount ratio graph of the fourth embodiment shown in FIG. 11 and that of the comparative example shown in FIG. 23, the marginal light amount ratio of the fourth embodiment is better than that of the comparative example.

In each of the fourth to sixth embodiments, as can be understood from the above description, the effective diameters of the second and third lens groups G2 and G3 are sufficiently small. In particular, in the fifth embodiment, the effective diameters of the second and third lens groups G2 and G3 are as small as about ⅓ of the effective diameter of the first lens group G1. Therefore, the driving mechanism for focusing and the driving mechanism for image position correction can be prevented from becoming bulky and complicated.

In each of the fourth to sixth embodiments above, the fixed stop FS is arranged between the third lens group G3 and the filter F. Alternatively, the fixed stop FS may be arranged on the image side of the filter F, or two fixed filters FS may be arranged on both the sides of the filter F. The fixed stop may be defined by the effective diameter of the filter F.

Furthermore, in each of the fourth to sixth embodiments above, the aperture stop S is fixed in position in the optical axis direction upon focusing. Alternatively, the aperture stop S may be moved along the optical axis integrally with or in synchronism with (in cooperation with) the second lens group G2. The aperture stop S may be arranged on the object side of the second lens group G2.

In each of the fourth to sixth embodiments above, aberration correction can be attained very satisfactorily regardless of vibration correction, while the number of lenses remains substantially equal to that of a normal inner-focus ultra-telephoto lens with a large aperture ratio.

In each of the fourth to sixth embodiments above, the image position correction group G3S is constituted by the entire third lens group G3. Alternatively, the effect of the present invention can be provided even when the image position correction group G3S is constituted by a partial lens group in the third lens group.

As described above, according to the image position correcting optical system of the fourth to sixth embodiments, the marginal light amount ratio upon stopping-down can be increased, and the effective diameters of the focusing group and the image position correction group can be reduced. Therefore, a size reduction, in the radial direction, of the lens barrel can be realized.

When the image position correcting optical system in the first to sixth embodiments above is to be applied to a vibration reduction optical system, a driving mechanism 10 and a sensor 20 described in, e.g., U.S. Pat. No. 5,619,735 are used as a driving mechanism for performing image position correction and a sensor for detecting the vibration of the optical system. The above U.S. Patent is hereby incorporated by reference.

What is claimed is:

1. An optical system capable of correcting an image position, comprising, in the following order from the object side:

a first lens group having a positive refractive power;

a second lens group having a negative refractive power; and a third lens group having a positive refractive power, wherein said second lens group is movable along a direction of an optical axis, said third lens group comprises an image position correction group which is movable in a direction substantially perpendicular to the optical axis, an aperture stop is arranged in an optical path between said second and third lens groups, and said optical system satisfies:

$$-0.2 \leq \phi 23 \leq 0.002$$

$$0.2 < \phi 1/|\phi 2| < 0.7$$

where $\phi 23$ is the synthesized refractive power of said second and third lens groups, $\phi 1$ is the refractive power of said first lens group, and $\phi 2$ is the refractive power of said second lens group.

2. An optical system according to claim 1, wherein said optical system satisfies:

$$-0.05 \leq \phi 23 \leq 0.001$$

where $\phi 23$ is the synthesized refractive power of said second and third lens groups.

3. An optical system according to claim 1, wherein said optical system satisfies:

$$0.29 < \phi1/\phi2 < 0.41$$

where $\phi1$ is the refractive power of said first lens group, and $\phi2$ is the refractive power of said second lens group.

4. An optical system according to claim 1, wherein said optical system satisfies:

$$0.1 < \phi3/\phi2 < 1.0$$

where $\phi2$ is the refractive power of said second lens group, and $\phi3$ is the refractive power of said third lens group.

5. An optical system according to claim 1, wherein said optical system satisfies:

$$0.4 < \phi3/\phi2 < 0.7$$

where $\phi2$ is the refractive power of said second lens group, and $\phi3$ is the refractive power of said third lens group.

6. An optical system according to claim 1, wherein said first lens group comprises at least one positive lens and at least one negative lens, and said optical system satisfies:

$$1.7 < na < 1.95$$
$$35 < va < 50$$

where na is the refractive index of a negative lens, located at a position closest to the object side, of the negative lenses in said first lens group, and va is the Abbe's number of the negative lens, located at the position closest to the object side, of the negative lenses in said first lens group.

7. An optical system according to claim 1, wherein said first lens group comprises at least one positive lens and at least one negative lens, and said optical system satisfies:

$$1.74 < na < 1.84$$
$$37 < va < 45$$

where na is the refractive index of a negative lens, located at a position closest to the object side, of the negative lenses in said first lens group, and va is the Abbe's number of the negative lens, located at the position closest to the object side, of the negative lenses in said first lens group.

8. An optical system according to claim 1, wherein said image position correction group comprises at least two positive lenses, and each of said positive lenses of lenses constituting said image position correction group satisfies:

$$1.40 < nb < 1.75$$
$$50 < vb < 98$$

where nb is the refractive index of each of said positive lenses, and vb is the Abbe's number of each of said positive lenses.

9. An optical system according to claim 1, wherein said image position correction group comprises at least two positive lenses, and each of said positive lenses of lenses constituting said image position correction group satisfies:

$$1.45 < nb < 1.63$$
$$62 < vb < 84$$

where nb is the refractive index of each of said positive lenses, and vb is the Abbe's number of each of said positive lenses.

10. An optical system according to claim 1, wherein said image position correction group comprises at least two positive lenses, and each of said positive lenses of lenses constituting said image position correction group satisfies:

$$1.45 < nb < 1.55$$
$$64 < vb < 84$$

where nb is the refractive index of each of said positive lenses, and vb is the Abbe's number of each of said positive lenses.

11. An optical system according to claim 1, wherein said image position correction group is constituted by the entire third lens group.

12. An optical system according to claim 1, wherein at least one fixed stop is arranged on the image side of said third lens group.

13. An optical system capable of correcting an image position, comprising, in the following order from the object side:

a first lens group having a positive refractive power;

a second lens group having a negative refractive power; and a third lens group having a positive refractive power, wherein said second lens group is movable along a direction of an optical axis, said third lens group is movable in a direction substantially perpendicular to the optical axis, an aperture stop is arranged in an optical path between said second and third lens groups, and said optical system satisfies:

$$-0.2 \leq \phi23 \leq 0.002$$
$$0.2 < \phi1/\phi2 < 0.7$$

where $\phi23$ is the synthesized refractive power of said second and third lens groups, $\phi1$ is the refractive power of said first lens group, and $\phi2$ is the refractive power of said second lens group.

14. An optical system according to claim 13, wherein said optical system satisfies:

$$-0.05 \leq \phi23 \leq 0.001$$

where $\phi23$ is the synthesized refractive power of said second and third lens groups.

15. An optical system according to claim 13, wherein said optical system satisfies:

$$0.29 < \phi1/\phi2 < 0.41$$

where $\phi1$ is the refractive power of said first lens group, and $\phi2$ is the refractive power of said second lens group.

16. An optical system according to claim 13, wherein said optical system satisfies:

$$0.1 < \phi3/\phi2 < 1.0$$

where $\phi2$ is the refractive power of said second lens group, and $\phi3$ is the refractive power of said third lens group.

17. An optical system according to claim 13, wherein said optical system satisfies:

$$0.4 < \phi3/\phi2 < 0.7$$

where $\phi2$ is the refractive power of said second lens group, and $\phi3$ is the refractive power of said third lens group.

18. An optical system according to claim 13, wherein said first lens group comprises at least one positive lens and at least one negative lens, and said optical system satisfies:

$$1.7 < na < 1.95$$

$$35 < va < 50$$

where na is the refractive index of a negative lens, located at a position closest to the object side, of the negative lenses in said first lens group, and va is the Abbe's number of the negative lens, located at the position closest to the object side, of the negative lenses in said first lens group.

19. An optical system according to claim 13, wherein said first lens group comprises at least one positive lens and at least one negative lens, and said optical system satisfies:

$$1.74 < na < 1.84$$

$$37 < va < 45$$

where na is the refractive index of a negative lens, located at a position closest to the object side, of the negative lenses in said first lens group, and va is the Abbe's number of the negative lens, located at the position closest to the object side, of the negative lenses in said first lens group.

20. An optical system according to claim 13, wherein said third lens group comprises at least two positive lenses, and each of said positive lenses of lenses constituting said third lens group satisfies:

$$1.40 < nb < 1.75$$

$$50 < vb < 98$$

where nb is the refractive index of each of said positive lenses, and vb is the Abbe's number of each of said positive lenses.

21. An optical system according to claim 13, wherein said third lens group comprises at least two positive lenses, and each of said positive lenses of lenses constituting said third lens group satisfies:

$$1.45 < nb < 1.63$$

$$62 < vb < 84$$

where nb is the refractive index of each of said positive lenses, and vb is the Abbe's number of each of said positive lenses.

22. An optical system according to claim 13, wherein said third lens group comprises at least two positive lenses, and each of said positive lenses of lenses constituting said third lens group satisfies:

$$1.45 < nb < 1.55$$

$$64 < vb < 84$$

where nb is the refractive index of each of said positive lenses, and vb is the Abbe's number of each of said positive lenses.

23. An optical system according to claim 13, wherein at least one fixed stop is arranged on the image side of said third lens group.

* * * * *